(12) United States Patent
Kamps et al.

(10) Patent No.: US 9,493,309 B2
(45) Date of Patent: Nov. 15, 2016

(54) CONVEYOR ELEMENT AND CONVEYOR DEVICE FOR CONVEYING BULK MATERIAL

(71) Applicant: BUEHLER GMBH, Beilngries (DE)

(72) Inventors: Rolf Kamps, Nuglar (CH); Christof Kaufmann, Niederuzwil (CH)

(73) Assignee: BUEHLER GMBH, Beilngries (DE)

( * ) Notice: Subject to any disclaimer, the term of this patent is extended or adjusted under 35 U.S.C. 154(b) by 0 days.

(21) Appl. No.: 14/888,865

(22) PCT Filed: Nov. 14, 2013

(86) PCT No.: PCT/EP2013/073826
§ 371 (c)(1),
(2) Date: Nov. 3, 2015

(87) PCT Pub. No.: WO2014/183811
PCT Pub. Date: Nov. 20, 2014

(65) Prior Publication Data
US 2016/0075517 A1      Mar. 17, 2016

(30) Foreign Application Priority Data

May 15, 2013   (WO) ................ PCT/EP2013/060046

(51) Int. Cl.
*B65G 19/14*   (2006.01)
*B65G 19/22*   (2006.01)
*B65G 45/18*   (2006.01)

(52) U.S. Cl.
CPC ............... *B65G 19/14* (2013.01); *B65G 19/22* (2013.01); *B65G 45/18* (2013.01)

(58) Field of Classification Search
CPC ...... B65G 19/14; B65G 19/20; B65G 19/22; B65G 35/08; B65G 45/18

USPC .......................................................... 198/716
See application file for complete search history.

(56) References Cited

U.S. PATENT DOCUMENTS 2,601,248 A * 6/1952 Brenholdt ............... F16L 55/48
                                                        138/97
2,680,511 A * 6/1954 Hapman ................ B65G 19/14
                                                       198/733

(Continued)

FOREIGN PATENT DOCUMENTS

DE         93 07 490       11/1993
JP         54-372          1/1979

(Continued)

OTHER PUBLICATIONS

PCT Search report and IPER issued in PCT/EP2013/073826.

(Continued)

*Primary Examiner* — Leslie A Nicholson, III
*Assistant Examiner* — Keith R Campbell
(74) *Attorney, Agent, or Firm* — Greenblum & Bernstein, P.L.C.

(57) ABSTRACT

Conveying element for conveying bulk goods includes a disk element including an upper side, a lower side and a side surface along a circumference of the disk element. A shank includes an upper end and a lower end. A shank head is located at the upper end. The lower end is connected to the upper side of the disk element and extends through the disk element up to the lower side. A shank head receiving element is arranged on one of the lower side of the disk element or the lower end. The side surface of the disk element is inclined at least in sections relative to a longitudinal axis of the shank.

19 Claims, 20 Drawing Sheets

(56) References Cited

U.S. PATENT DOCUMENTS

| | | | |
|---|---|---|---|
| 3,250,379 A * | 5/1966 | Leach | B65G 19/14 198/732 |
| 4,197,938 A | 4/1980 | Klinkenberg | |
| 4,301,768 A | 11/1981 | Osborn | |
| 4,468,256 A * | 8/1984 | Hinger | C13K 1/02 127/1 |
| 4,724,772 A | 2/1988 | Krogsrud | |
| 5,147,029 A | 9/1992 | Wadell | |
| 6,790,399 B2 * | 9/2004 | Fujii | A01K 5/0208 264/254 |
| 2007/0170043 A1 * | 7/2007 | Raijmakers | B65G 19/14 198/805 |
| 2007/0258773 A1 | 11/2007 | Bennett | |
| 2015/0136569 A1 * | 5/2015 | Kamps | B65G 19/14 198/716 |

FOREIGN PATENT DOCUMENTS

| | | |
|---|---|---|
| JP | 1-134612 | 9/1989 |
| JP | 6-23923 | 3/1994 |
| NL | 1025855 | 10/2005 |

OTHER PUBLICATIONS

Chinese Office Action and English language translation of parts thereof dated Jul. 18, 2016 and issued in CN 201380076278.0 (17 pages).

* cited by examiner

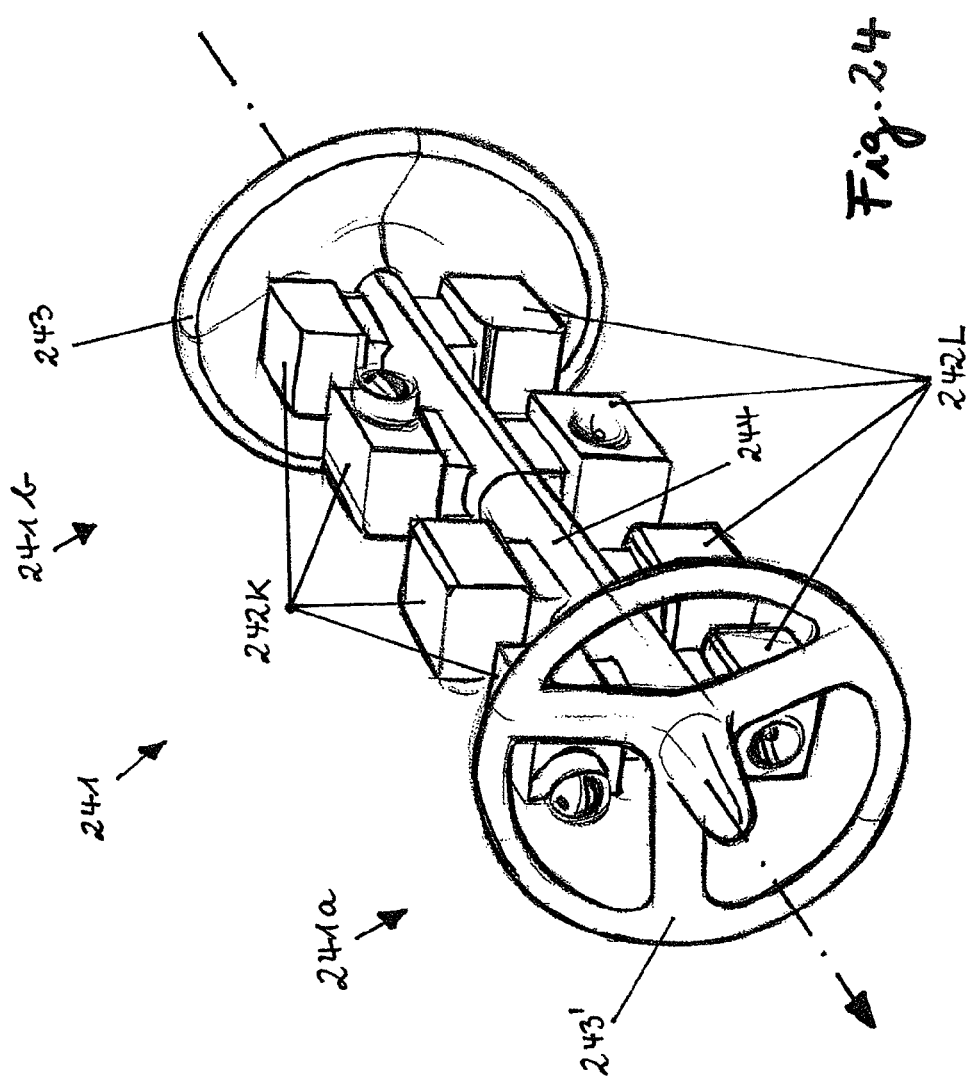

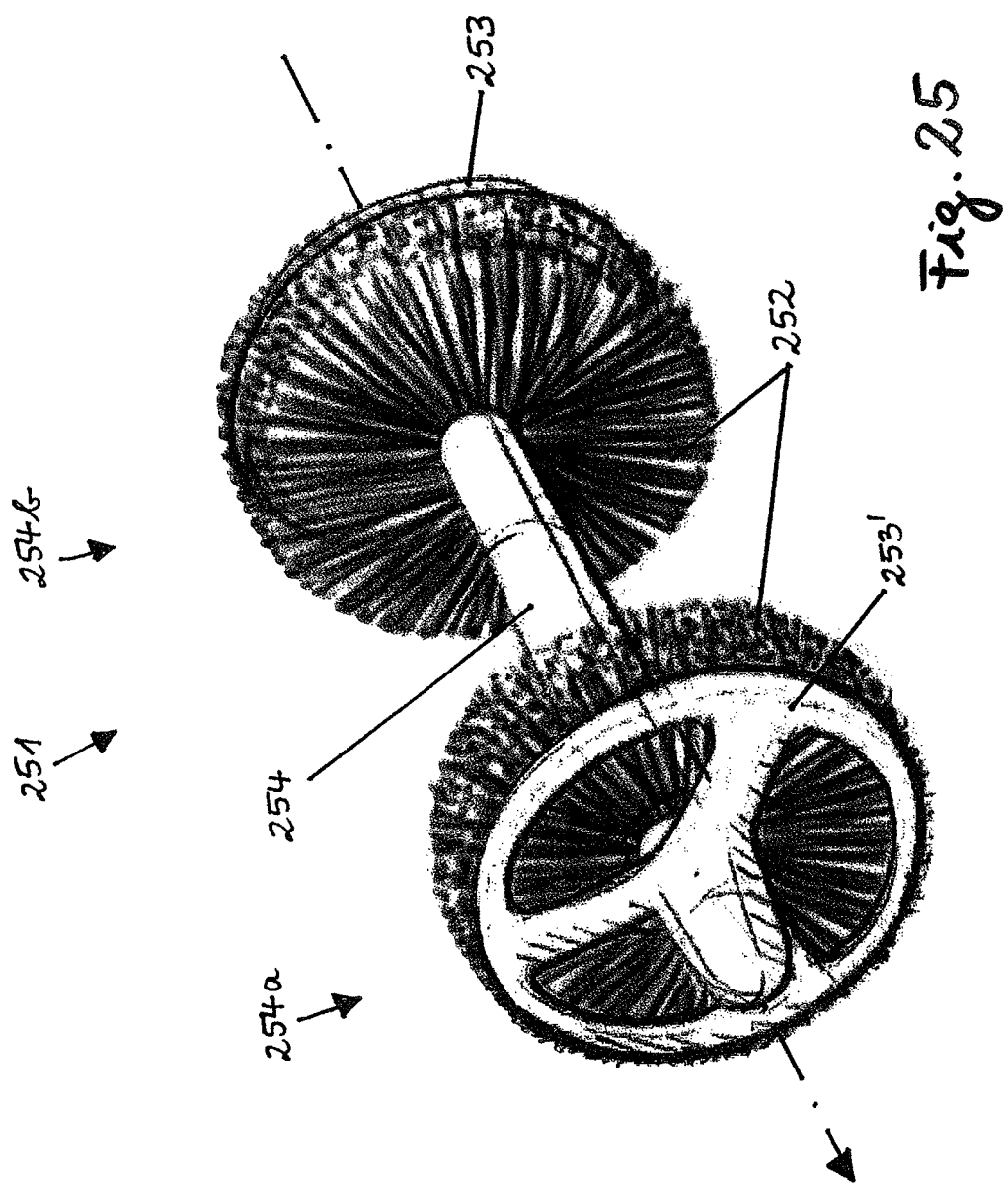

CONVEYOR ELEMENT AND CONVEYOR DEVICE FOR CONVEYING BULK MATERIAL

The invention relates to a conveying device and a conveying element (carrier) for conveying bulk goods.

Conveying devices of this kind, which are suitable for conveying bulk goods such as, for example, rice, flour wheat or corn, along i.a. curved pipes from an inlet for the bulk goods to an outlet for the bulk goods are known from the prior art as tube or pipe chain conveyors or retarding disk conveyors.

U.S. Pat. No. 4,197,938 discloses a conveying device for bulk goods comprising disk-like carriers. The carriers are arranged at a cable, wherein the cable comprising the carriers can be driven by means of a gear wheel for conveying the bulk goods i.a. along curved pipe sections from an inlet to an outlet.

This known conveying device for bulk goods is disadvantageous in that, for example, when the carriers are damaged during operation, replacement thereof is laborious, thus leading to increased maintenance costs and reducing the mean throughput of bulk goods through the conveying device. Moreover, when a cable is used as pulling element with carriers mounted thereto, a length adaptation, for example, for decreasing or increasing the length of the conveying device is complex. Moreover, the known conveying device is disadvantageous in that a filling level of the conveying device cannot be adjusted.

NL 1025855 discloses a conveying device having a plurality of carriers comprising an electrically conducting and/or magnetic material.

Therefore, it is an object of the present invention to avoid the disadvantages of the known subject-matter, in particular to provide a conveying device, a carrier and a feeding device as well as a method by means of which a reliable operation of the conveying device is possible with little maintenance being necessary, wherein the operation of the conveying device is cost-efficient. It is a further object to provide a feeding device for allowing an adjustability of a filling level of the conveying device. It is an additional object of the present invention to provide a method for upgrading and/or converting or refitting already installed conveying devices so that they can be easily maintained during operation and are cost-efficient.

These objects are achieved by a conveying element (carrier) and a conveying device according to the claims.

General Description of the Principle of a Conveying Device According to the Invention For example, a conveying device comprises a conveying channel. The conveying channel is formed in particular as a conveying pipe. At least one carrier is arranged in the conveying channel. In particular, at least two carriers are arranged in the conveying channel. The conveying device comprises at least one drive for driving the at least one carrier for conveying bulk goods along a conveying channel axis. The at least one carrier is loosely arranged in the conveying channel at least in some sections along the conveying channel axis.

In the meaning of the present application, a "conveying device" is understood to be a device for in particular continuously conveying bulk goods. In the meaning of the present application, a "continuous conveying" of bulk goods is in particular also understood to be a conveying of bulk goods in which the flow of bulk goods in the conveying channel is interrupted in some sections by carriers.

In the meaning of the present application, a "conveying channel" is understood to be a channel along the longitudinal axis of which bulk goods can be conveyed. For example, a conveying channel can be formed as an open groove or as a hollow body with circular, triangular, rectangular or square cross-section or any other cross-sectional shapes. In particular, the conveying channel is formed as a conveying pipe having a circular cross-section perpendicular with respect to the longitudinal axis of the conveying pipe. Further, the conveying channel is in particular formed as a circumferential closed loop.

In the meaning of the present application, "a conveying channel axis" is understood to be the longitudinal axis of the conveying channel along which, when being used as intended, the bulk goods are conveyed.

In the meaning of the present application, a "carrier" ("conveying element") is understood to be an element by means of which, when being used as intended, bulk goods can be conveyed substantially parallel with respect to the longitudinal axis of the conveying channel by positioning the carrier along the longitudinal axis. In particular, the carrier can be arranged in a hollow body such as, e.g., a conveying pipe, and can be positioned along the axis of the hollow body for conveying bulk goods along the axis of the hollow body.

In the meaning of the present application, the term "bulk goods" is understood to be grainy, floury or also fragmented goods which are present in pourable form and are in particular capable of flowing. In particular, bulk goods are understood to be rice, flour, grain, wheat, corn, flowing, powdery substances and any combinations thereof.

In the meaning of the present application, a "loose arrangement of a carrier at least in some sections along the conveying channel axis" is understood to be a carrier which is not directly connected to a drive in this section. In this section, such a carrier is only moved along the conveying channel axis by carriers arranged adjacently along the conveying channel axis and/or bulk goods being conveyed. For example, in a drive section, a force is exerted on a carrier substantially parallel with respect to the conveying channel axis, so that the carrier and bulk goods being in contact with it are positioned substantially parallel with respect to the conveying channel axis, wherein the carrier and/or the bulk goods are moved outside the drive section of the conveying device along the conveying channel axis.

In the meaning of the present application, the wording "A and/or B" is understood to mean the following possible combinations: A; B; A and B; A and no B; B and no A.

Designing the conveying device with at least one carrier being loosely arranged in the conveying channel is advantageous in that a replacement of an, e.g., damaged carrier is easily possible because the carrier is loosely arranged in the conveying channel. Hence, the maintenance effort is reduced and thus the operation of the conveying device becomes more cost-efficient. Moreover, an adaptation to different conveying channel lengths by removing or adding a carrier is advantageous.

In particular, the conveying channel is S-shaped in at least one side view. This is advantageous in that a place-saving arrangement of the conveying device in particular in only one floor is possible. In the prior art, normally two or three floors in which the conveying device is arranged are necessary in this regard.

At least in the drive area, the conveying channel, in particular the conveying pipe, can comprise steel or can be made of steel.

Preferably, the conveying channel is formed as a guide means along the conveying channel axis for the carrier.

In the meaning of the present application, a "guide means" is understood to be a means for limiting the movement of the carrier substantially perpendicularly with respect to the conveying channel axis.

This design of the conveying channel as a guide means for the carrier is advantageous in that the carrier can only make a slight movement perpendicularly with respect to the conveying channel axis, so that damage to the carrier during operation is minimized.

This design of the conveying channel as guide means can, e.g., be achieved in that the mean cross-section of the conveying channel along the conveying channel axis has substantially a shape being congruent to the mean cross-section of the carrier along the conveying channel axis so that the carrier can still be inserted in the conveying channel and has little play in a direction laterally with respect to the conveying channel axis.

Particularly preferably, the drive is realized such that at least in some sections a force can be exerted by the drive directly on the carrier substantially parallel with respect to the conveying channel axis. For this purpose, the carrier can have at least one drive surface on which said force can be exerted. Advantageously, the drive surface is elastic and can be made, e.g., of plastic or rubber or can be coated therewith. It can thus be achieved that between the drive and the carrier there is not only a punctiform contact but a linear or even planar contact. Moreover, the drive surface can comprise steel or can be made of steel.

In the meaning of the present application, the wording that "a force can be exerted directly" is understood such that the force is exerted by the drive on the respective carrier and not by further carriers arranged between the drive and the carrier and/or by bulk goods.

This design of the drive is advantageous in that the force can be transmitted to the carrier in a reliable manner even if the carriers are arranged in a loose manner.

Particularly preferably, at least in a drive section, the drive reaches into the conveying channel for exerting a force on a carrier arranged in the drive section in a manner substantially parallel with respect to the conveying channel axis.

This is advantageous in that the drive must be arranged only in a portion of the device, which facilitates maintenance of the conveying device and simplifies the structural design of the conveying device.

In particular, the overall length of the carriers arranged in the conveying channel is smaller than the length of the conveying channel axis. Preferably, the overall length of the carriers is larger than the length of the conveying channel axis minus the length of the at least one drive section.

This is advantageous in that the drive of the carriers in the conveying channel can be reliably guaranteed.

The "overall length" of the carriers is understood to be the effective longest elongation of a carrier along the conveying channel axis multiplied by the number of carriers arranged in the conveying channel. If the carriers have different designs, the "overall length" of the carriers is understood to be the sum of the effective longest extensions of the carriers along the conveying channel axis.

Preferably, the drive is configured such that a force can be exerted on the carrier substantially in the circumferential region of the carrier facing the inner wall of the conveying channel.

In the meaning of the present application, the wording that "a force can be exerted substantially in the circumferential region of the carrier facing the inner wall of the conveying channel" is understood such that the drive engages with the carrier by means of a drive means for exerting a force, wherein the drive means directly contacts a section in the circumferential direction of the carrier.

This design is advantageous in that the drive must engage with the conveying channel only in the area of the inner wall in order to achieve the drive effect, so that collisions of the drive with other parts of the carrier or also a compression of bulk goods is minimized.

Particularly preferably, the drive can be selected or is selected from the list of the following kinds of drives or any combinations thereof: chain drive, belt drive, coupler mechanism, gear drive, worm drive, magnet drive, servo drives, direct drives. The coupler mechanism can be realized, e.g., as four bar mechanism, in particular as straight line drive.

Drives of this kind are known to the person skilled in the art per se. Advantageously, the best suitable drive can be selected in accordance with the requirements as well as, e.g., the structural boundary conditions.

In particular, a coupler mechanism is used, which turned out to be particularly advantageous during operation.

When using a magnet drive, it is in particular necessary to select the material for the carrier such that the alternating magnetic fields generated by the magnet drive allow the carriers to be driven.

In a first preferred version, the drive comprises at least one carrier bolt by means of which at least in some sections a force can be exerted directly on the carrier substantially parallel with respect to the conveying channel axis, in particular on a drive surface of the carrier. The carrier bolt preferably extends in a vertical direction at least while a force is exerted on the carrier.

Advantageously, the drive of this first version is realized as a chain drive and comprises at least one pair of driving chains, wherein any one of two opposite ends of the carrier bolt is mounted to a respective drive chain of the pair of drive chains. In case the carrier bolts extend vertically, the drive then comprises at least one lower drive chain and at least one upper drive chain.

The drive can comprise only one single or a plurality of drive chain pairs with respective carrier bolts. In some embodiments of the first version, the carrier bolts are arranged laterally of the conveying channel. Preferably, the carrier bolts of a first drive chain pair are arranged at a first side of the conveying channel, and the carrier bolts of a second drive chain pair are arranged at a second side of the conveying channel opposite the first side. It is thus possible to prevent the carriers from becoming wedged together while the carrier bolts exert a force on them.

It is also preferable that the distance between two adjacent carrier bolts is substantially identical to the extension of the carriers along the conveying channel axis. This means that the distance between two adjacent carrier bolts is at least as large as the extension of the carriers along the conveying channel axis and at most 1.5 times, preferably at most 1.25 times and particularly preferably at most 1.1 times this extension. In this manner it can be achieved that while being driven, the carriers contact each other at least nearly and thus the distance between them is as small as possible. Preferably, the distance between two adjacent carrier bolts is larger than the extension of the carriers along the conveying channel axis, in particular the ratio of these values can be at least 1.01. It is thus possible to achieve a certain play so as to compensate for production tolerances and/or wear tolerances.

In a second preferred version, the drive is realized as a chain drive or belt drive and comprises at least one drive chain having at least one carrier projection. By means of this carrier projection, at least in some sections a force can be directly exertable on the carrier, in particular on a drive surface of the carrier, substantially parallel with respect to the conveying channel axis.

Also in the second version, the drive chain can be arranged laterally of the conveying channel. Only one single drive chain or also a plurality of drive chains can be present. For example, a first drive chain with carrier projections can be arranged at a first side of the conveying channel and a second drive chain with carrier projections can be arranged at a second side of the conveying channel opposite the first side. Also in this manner the carriers can be prevented from becoming wedged together while the carrier bolts exert a force on them.

It is also preferable that the distance between two adjacent carrier projections is substantially identical to the extension of the carriers along the conveying channel axis. This means that the distance between two adjacent carrier projections is at least as large as the extension of the carriers along the conveying channel axis and at most 1.5 times, preferably at most 1.25 times and particularly preferably at most 1.1 times this extension. In this manner it can also be achieved that while being driven, the carriers contact each other at least nearly and thus the distance between them is as small as possible. Preferably, the distance between two adjacent carrier projections is larger than the extension of the carriers along the conveying channel axis, in particular the ratio of these values can be at least 1.01. It is thus possible to achieve a certain play so as to compensate for production tolerances and/or wear tolerances.

In a third preferred version, the drive is realized as a worm drive and comprises at least one rotatable drive worm by the rotational movement of which at least in some sections a force can be exerted directly on the carrier, in particular on a drive surface of the carrier, substantially parallel with respect to the conveying channel axis. To this end, it is particularly preferred if the rotational axis of the drive worm extends substantially parallel with respect to the conveying channel axis.

Also in this third version only one single or also a plurality of rotary drive worms can be present. For example, a first drive worm can be arranged at a first side of the conveying channel, and a second drive worm can be arranged at a second side of the conveying channel opposite the first side.

It is also preferred that the extension of the carriers along the conveying channel axis is substantially an integer multiple of the pitch of the drive worm. This means that the ratio of the extension of the carriers along the conveying channel axis and the pitch of the drive worm is at most by 0.4, preferably at most by 0.2 and particularly preferably at most by 0.1 smaller than an integer, wherein this integer can be, e.g., 1, 2, 3, 4, 5 or 6. For example, said ratio might lie in the range of 3.6 to 4, preferably 3.8 to 4, and particularly preferably 3.9 to 4. Also in this manner it can be achieved that while being driven, the carriers contact each other at least nearly and thus the distance between them is as small as possible. It is also preferred that said ratio is at least by 0.01 smaller than the mentioned integer. It is thus possible to achieve a certain play so as to compensate for production tolerances and/or wear tolerances.

In case there are multiple drive chain pairs and/or drive chains and/or drive worms, they are preferably synchronized with each other. This is possible, for example, by means of a gear drive known per se, by means of which the driving force can be transferred from a motor to a plurality of or all drive chains and/or drive worms. By means of such a synchronization it can in particular be guaranteed that the carrier bolts described above extend in a vertical direction at least while a force is exerted on the carrier and that a plurality of carrier bolts, carrier projections or drive worms move at the same speed.

Preferably, the drive section has a length in the direction of the conveying channel axis which is at least twice, preferably at least three times the length of a carrier. It can thus be guaranteed that at any time at least one carrier is located completely in the drive section.

At least one guiding element can be present at an inner wall of the conveying channel, and the carrier can have a corresponding counter guiding element by means of which the carrier can be guided along the guiding element. Tilting or wedging of the carrier can thus be prevented. The guiding element can be realized, e.g., as a lateral guiding plate. Preferably, at least two and more preferably exactly two opposite lateral guiding plates are arranged at the inner wall of the conveying channel.

Alternatively, the carriers can be centered by means of the carrier bolts described above. The drive chain described above can be guided laterally and can thus take up lateral forces.

Particularly preferably, a force transmission between two carriers arranged adjacently in the conveying channel parallel with respect to the conveying channel axis can be achieved by a direct contact between the carriers and/or by bulk goods arranged between the carriers in the conveying channel.

This is advantageous because it is sufficient to arrange only one drive in a drive section, which makes the conveying device more cost efficient and facilitates its maintenance.

General Description of the Principle of a Conveying Element According to the Invention A further aspect of the present invention relates to a carrier (conveying element) for conveying bulk goods in a conveying device as described above. The carrier comprises a carrier surface and an alignment means for aligning the mean surface perpendicular of the carrier surface at least in some sections substantially parallel with respect to the conveying channel axis.

In the meaning of the present application, a "carrier surface" of the carrier is understood to be the surface which substantially causes the bulk goods to be conveyed in the conveying device when the carrier is used as intended.

An "alignment means" is understood to be a means for aligning the carrier surface of the carrier in the conveying channel in such a manner that, when being used as intended, the carrier is suitable for conveying bulk goods. For example, this can be achieved by a corresponding dimensioning as a cylinder, by means of struts (shanks) arranged at the circumference of the carrier parallel with respect to the conveying axis, or by spaced-apart disks connected by a strut (shank).

In the meaning of the present application, the "mean surface perpendicular" of the carrier surface is understood to be the mean value of the surface perpendicular on the effective carrier surface which, when being used as intended, can come in contact with bulk goods.

The alignment of the carrier surface by means of an alignment means substantially parallel with respect to the conveying channel axis is advantageous in that the carrier surface takes a desired position during operation and thus allows an efficient and cost-saving operation. Since the alignment means is arranged at the carrier itself, for example when a carrier is damaged, it is easily possible to replace said carrier because the carrier can be arranged loosely in the conveying channel, which facilitates maintenance.

Preferably, when the mean surface perpendicular of the carrier surface is aligned substantially parallel with respect to the conveying channel axis, the carrier surface covers the mean conveying channel cross-section to an amount being smaller than 100%. Preferably, the mean conveying channel cross-section is covered in the range of 50% to 99.9% and particularly preferably of 80% to 99.9%. In particular, the covering might lie in the range of 85% to 99.9%, optionally in the range of 90% to 99.8%, and further optionally of 92% to 97%. In particular, the covering is selected depending on the bulk goods to be conveyed.

In the meaning of the present application, the "mean conveying channel cross-section" is understood to be the mean value of the cross-sectional surfaces perpendicular to the conveying channel axis, through which bulk goods are conveyed when being used as intended.

The advantage thereof is an efficient conveying of bulk goods along the conveying channel, leading to a cost-efficient operation.

Particularly preferably, the alignment means is configured as at least a first surface element and a second surface element which are spaced from each other substantially parallel with respect to the conveying channel axis and arranged so as to be in operational contact with each other, wherein the mean surface perpendiculars of the surface elements are arranged substantially parallel with respect to the conveying channel axis.

The advantage thereof is a simple structural design of the carrier. Furthermore, this design has the advantages mentioned above in view of the alignment means.

For example, the carrier can thus be formed of two circular disks being spaced apart from each other parallel with respect to the conveying channel axis and being connected to each other by means of a strut (shank) which is also arranged substantially parallel with respect to the conveying channel axis.

The drive surface of the carrier can be arranged at one of the two surface elements. In particular, the carrier surface can be formed by a first side of one of the two circular disks, and the drive surface can be formed by a second side of this disk opposite the first side.

Particularly preferably, the surfaces enclosed by the circumference of the first surface element and the second surface element are formed substantially congruently when being projected parallel with respect to the mean surface perpendiculars.

In the meaning of the present application, the "surface enclosed by the circumference" of the first surface element and/or the second surface element is understood such that the outer envelopes of the first surface element and/or the second surface element can be mapped substantially congruently on each other when being arranged in a conveying channel. For example, two full-surface, circular disks being arranged parallel with respect to each other and having an identical diameter are formed substantially congruently with respect to surfaces arranged parallel with respect to each other. Also a circular, full-surface disk without openings is, when being arranged in a conveying pipe with circular cross-section, formed substantially congruently with respect to a surface element comprising radially arranged struts (shanks) with hollow spaces between the struts if the struts have the same radius as the circular, full-surface disk.

Forming the first surface element and the second surface element substantially congruently with respect to each other is advantageous in that the carrier has a simple structural design which further simplifies maintenance and reduces the costs of the carrier.

Preferably, the first surface element of the carrier facing the conveying direction of the bulk goods lets the bulk goods go through. In particular, the second surface element comprises the carrier surface. In particular, the second surface element is arranged at the side of the carrier facing away from the conveying direction.

In the meaning of the present application, the "conveying direction" is understood to be the direction in which the bulk goods are, on average, conveyed along the conveying channel in the conveying device, in particular in a section along the conveying channel.

In the meaning of the present application, the term "lets go through" for a surface element is understood such that the bulk goods to be conveyed are allowed to go through. For example, the ability that the bulk goods go through can be achieved by arranging sufficiently large openings for the bulk goods in the first surface element.

The ability of the first surface element, which is arranged in a manner spaced apart from the second surface element substantially parallel with respect to the conveying channel axis, to let bulk goods go through is advantageous in that the space between the surface elements can be used for conveying bulk goods, which increases the throughput and is thus more efficient in view of the costs.

Particularly preferably, the carrier comprises a spacer at the side facing the conveying direction and/or at the side facing away from the conveying direction. In particular, the spacer is an arm arranged substantially parallel with respect to the conveying channel axis. Moreover, the spacer is in particular formed at the end facing away from the carrier in a ball-shaped or dome-shaped manner.

In the meaning of the present application, the wording "ball-shaped or dome-shaped" is understood such that a ball or a dome is arranged at the end of the spacer facing away from the carrier. A dome is understood to be a flattened section of a ball.

The arrangement of at least one spacer at the carrier is advantageous in that a minimum distance for efficiently conveying bulk goods in the conveying channel can be achieved by means of structurally simple means, which reduces the maintenance efforts and makes the operation cost-saving and efficient. Arranging a ball-shaped or dome-shaped spacer is advantageous in that also in curved conveying channels the spacer functions reliably and the occurrence of high point loading is minimized, which reduces wear and thus the maintenance efforts.

At the side facing the conveying direction or at the side facing away from the conveying direction, the carrier particularly preferably comprises a recess which is formed such that the spacer can engage with the recess.

In particular, the recess is funnel-shaped and moreover in particular at least in some sections ball-shaped or at least in some sections parabolic.

This is advantageous in that also in curved areas of the conveying channel, a spacer can reliably engage with the recess, which makes the operation more reliable and reduces wear, leading to reduced maintenance efforts.

General Description of the Principle of a Feeding Device for Bulk Goods, for Example for a Conveying Device According to the Invention A further aspect relates to a feeding device for bulk goods into an inlet in a conveying device comprising a conveying channel having an inner wall. In particular, the feeding device is used together with a conveying device as described above and optionally with a carrier as described above. The bulk goods can be conveyed into the conveying device substantially by means of gravity. In particular, the feeding device is arranged in a substantially horizontal section of the conveying device. The inlet covers an angular range of the inner wall of greater than 0° to smaller than 180° and/or smaller than 0° to greater than −180° relative to the gravity direction. Preferably, the angular range is greater than 20° to smaller than 160° and/or smaller than −20° to greater than −160°. Particularly preferably, the angular range is greater than 45° to smaller than 150° and/or smaller than −45° to greater than −150°.

In the meaning of the present application, an "angle relative to the gravity direction" is understood such that the gravity direction defines an angle of 0° and a positive angle is measured in the clockwise direction relative to the gravity direction and a negative angle in the counterclockwise direction.

In the meaning of the present application, a "substantially horizontal section" is a section which is arranged substantially perpendicular with respect to the gravity direction.

In the meaning of the present application, an "angular region covering the inner wall" is understood such that the inlet into the conveying device covers an opening angle measured from the conveying channel axis, i.e. the center of the conveying channel. The angular range should be understood to be the mean angular range.

For example, the inlet is arranged at the side if the inlet is arranged in a substantially horizontal section of the conveying device.

Arranging the inlet in the described angular range is advantageous in that a filling height or filling level can be adjusted in the conveying channel depending on the requirements. The angular range can be selected advantageously depending on the bulk goods used.

For example, the angular range can be firmly adjusted. This is advantageous in that the angular range can be fixed to an optimum value, e.g., for bulk goods to be conveyed, which renders the operation of the conveying device more reliable.

The angular range is preferably adjustable, in particular by means of a slide.

For example, the slide can be arranged as a rotary slide and/or as a rotary sleeve at the conveying channel and/or at the feeding device.

The adjustability of the angular range is advantageous in that, depending on the requirements as to the conveying of the bulk goods as well as also depending on the bulk goods to be conveyed, the angular range is adjustable for adjusting the filling level in the conveying channel.

Particularly preferably, the conveying device comprises a redirecting portion for conveying the bulk goods to the inlet.

This is advantageous in that the bulk goods, which are stored, e.g., upstream in a storage container, can be conveyed through the redirecting portion to the conveying channel, wherein the conveying speed or conveying rate of the bulk goods into the conveying channel can be adjusted by the redirecting portion.

In the meaning of the present application, a "redirecting portion" is understood to be a portion in which the bulk goods are redirected from a conveying direction substantially parallel with respect to the gravity direction.

Particularly preferably, the redirecting portion is formed as a redirecting surface and arranged at a redirecting angle relative to the gravity direction in the range of 30° to 70°.

Preferably, the redirecting angle lies in the range of 40° to 60°, particularly preferably of 45° to 55°.

Alternatively, the redirecting angle can also be −30° to −70°, preferably −40° to −60° and particularly preferably −45° to −55°.

Arranging a redirecting surface in the described angular range is advantageous in that the amount of supplied bulk goods can be adjusted depending on the bulk goods used and the required flow rate.

In particular, the redirecting angle is adjustable, which advantageously allows the redirecting angle to be adjusted depending on the respective requirements.

General Description of the Principle of a Method for Conveying Bulk Goods by Means of a Conveying Device According to the Invention and/or at Least one Conveying Element According to the Invention An additional aspect relates to a method for conveying bulk goods by means of a conveying device as described above. Optionally, the conveying device comprises a carrier as described above. Further optionally, the device comprises a feeding device as described above. The method comprises the step of conveying the bulk goods from an inlet to an outlet.

The method comprises the advantages described above.

General Description of the Principle of a Method for Upgrading and/or Converting or Refitting a Conveying Device According to the Invention A further aspect relates to a method for upgrading and/or converting or refitting a conveying device for conveying bulk goods. The method comprises the step of mounting at least one carrier in order to build a conveying device as described above. In particular, a carrier as described above is mounted. The method further optionally comprises the step of mounting a feeding device as described above.

This is advantageous in that already installed conveying devices can be upgraded and/or converted or refitted to become a conveying device according to the present invention, which is cost-efficient because no installation of a completely new conveying device is necessary.

Basic explanations, general definitions and particular features which have been described in a specific paragraph (e.g. with respect to the conveying device) in the present application also apply to other paragraphs (e.g. with respect to the conveying element) in this application.

Further features and advantages of the invention will be discussed in more detail below on the basis of embodiments for a better understanding thereof, without the invention being restricted to the embodiments.

FIG. 13b shows a top view of a conveying device according to FIG. 13a;

FIG. 14b shows a top view of the conveying device according to FIG. 14a;

FIG. 15b shows a top view of the conveying device according to FIG. 15a;

FIG. 16b shows a top view of the conveying device according to FIG. 16a;

FIG. 17b shows a top view of the conveying device according to FIG. 17a;

FIG. 18b shows a top view of the conveying device according to FIG. 18a;

FIG. 24 shows a perspective view of a conveying element according to an embodiment of the invention;

FIG. 25 shows a perspective view of a conveying element according to an embodiment of the invention.

In the following, first FIGS. 1 to 19 are described.

Figure 1:
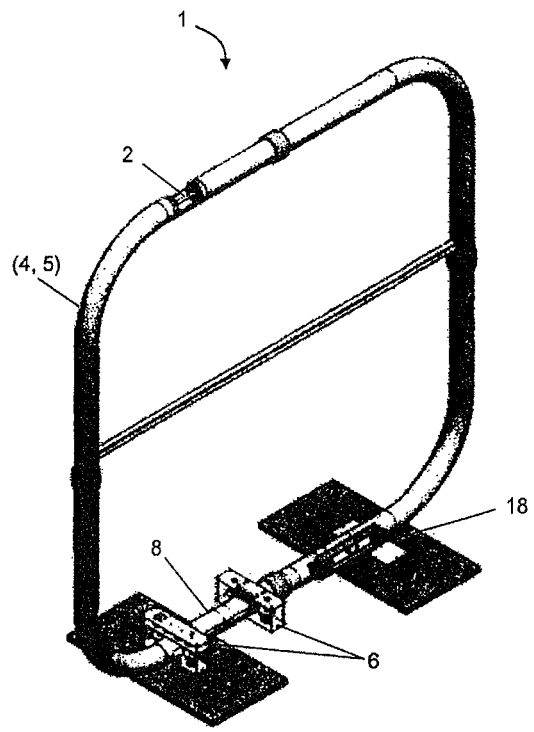
FIG. 1 shows a perspective view of a conveying device of the invention.

FIG. 1 shows a perspective view of a conveying device 1 of the invention for conveying bulk goods. The conveying channel 4 is formed as a conveying pipe 5, which can be made, e.g., of steel or plastic. The conveying channel 4 is formed in a circumferentially closed manner so that carriers (conveying elements) 2 arranged in the conveying channel 4 can rotate endlessly.

A plurality of carriers 2, which are driven by means of the drive 6 in the drive section 8, are arranged in the conveying device 1. The carriers are arranged loosely along the conveying channel axis in the conveying channel 4.

Bulk goods are conveyed by means of the feeding device 18 into the conveying channel 4.

Figure 2:
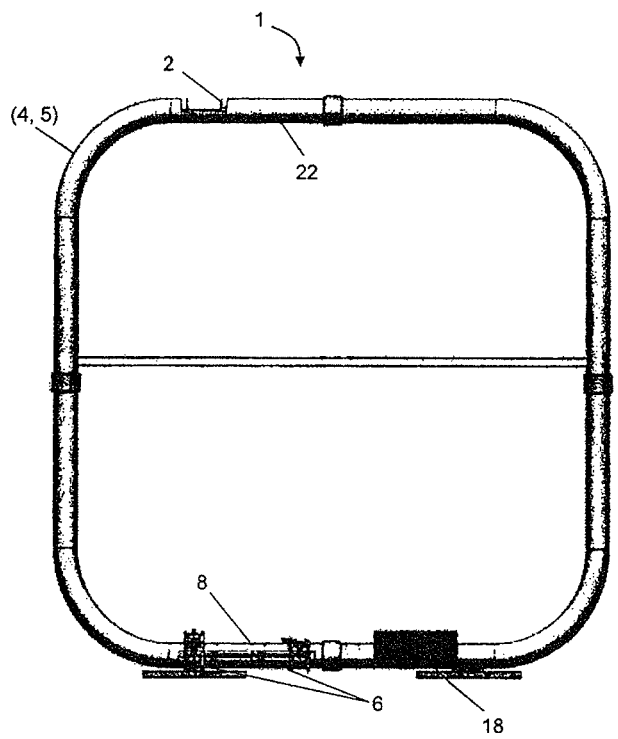
FIG. 2 shows a front view of the conveying device of the invention according to FIG. 1.

FIG. 2 shows a front view of the conveying device 1 according to FIG. 1.

In the following, equal reference numbers designate equal features in the Figures and, therefore, are only explained again if necessary.

In the illustration according to FIG. 2, an outlet 22 is shown. During operation, bulk goods are conveyed by the feeding device 18 into the conveying channel 4. The bulk goods in the conveying channel 4 are conveyed by the driven carriers 2 to the outlet 22 where the bulk goods fall out of the conveying device 1, e.g., into a collecting container not shown here.

Figure 3:
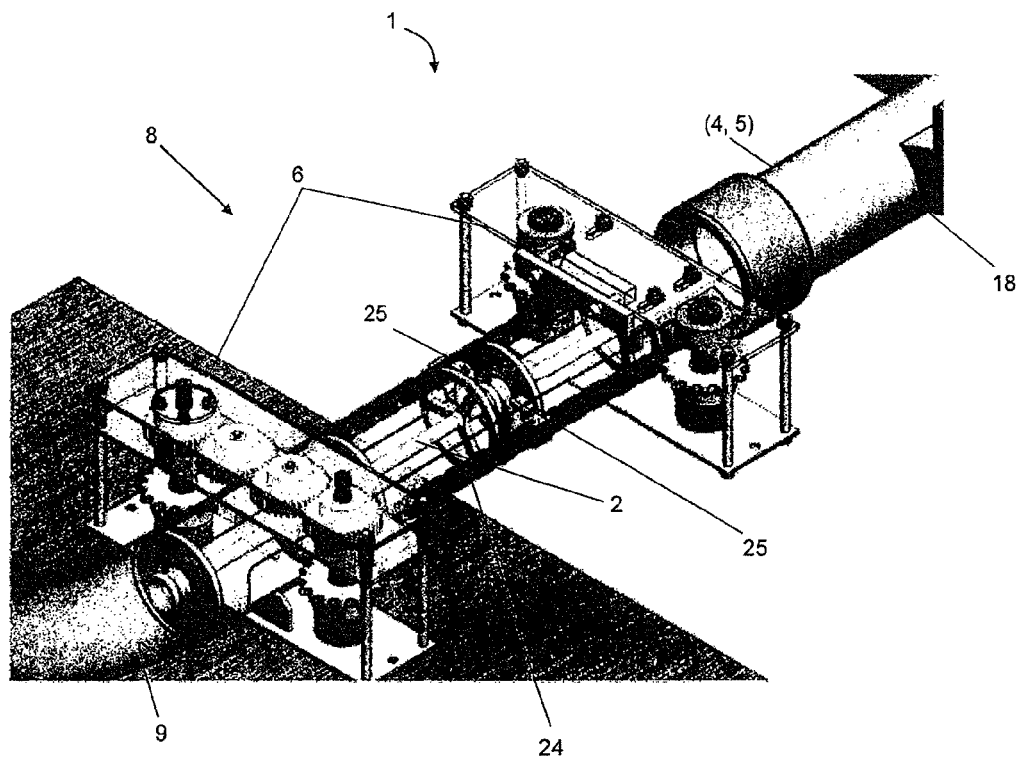
FIG. 3 shows an enlarged view of the drive section of the conveying device of the invention according to FIG. 1.

FIG. 3 shows a perspective view of the area comprising the drive section 8 of the conveying device 1 according to FIG. 1. The conveying pipe 5 has an inner wall 9 which acts as a guiding means along the conveying channel axis for the carrier 2.

In the drive section 8, drive arms 25 exert a force on the carriers 2 in a manner substantially parallel with respect to the conveying channel axis. The drive arms 25 are moved by a drive chain 24 in the drive section 8 substantially parallel with respect to the conveying channel axis. The force is applied to the carrier 2 substantially in the circumferential area of the carrier 2 facing the inner wall 9 of the conveying channel.

Figure 4:
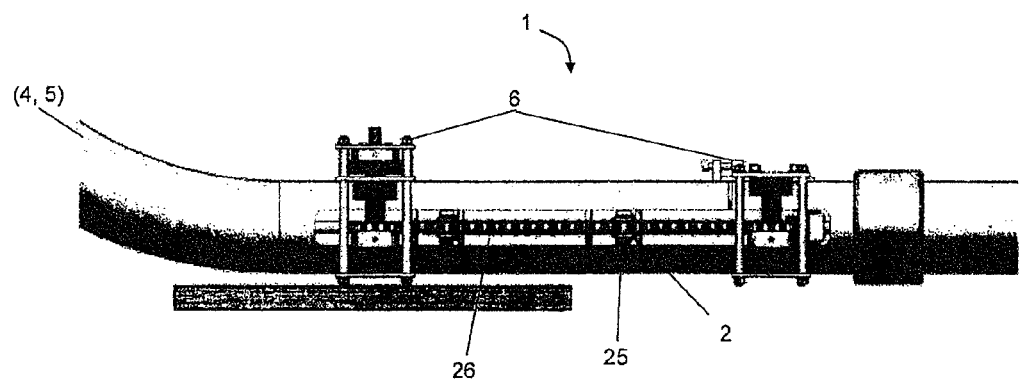
FIG. 4 shows a front view of a section of the conveying device of the invention according to FIG. 1 and comprising the drive section.

FIG. 4 shows a front view of a part of the section of the conveying device 1 according to FIG. 3.

The drive arms 25, which are driven by the drive chain 24, engage with the conveying pipe 5 through an engagement opening 26. Since bulk goods are conveyed by means of the drive 6 only downstream of the drive section, sealing of the engagement opening 26 is not necessary in any case.

Figure 5:
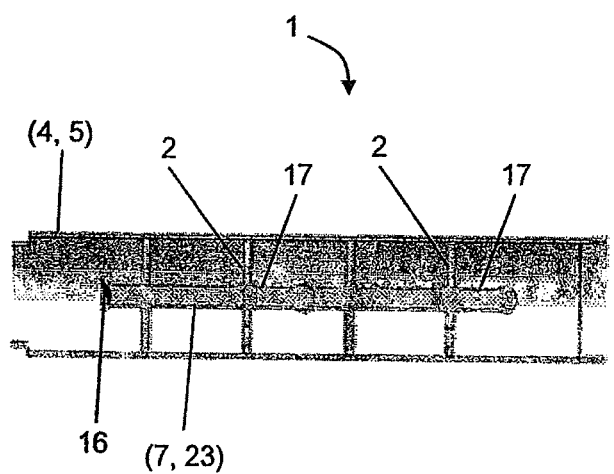
FIG. 5 shows a section of a conveying device of the invention comprising two carriers in a straight conveying pipe.

FIG. 5 schematically shows a section of the conveying channel 4 which is realized as a conveying pipe 5 and comprises two carriers 2. At the side of the carriers 2 facing the conveying direction, the carriers 2 have arms 17 serving as spacers. At the side facing away from the conveying direction, the carriers 2 have recesses 16 with which an adjacently arranged carrier 2 can optionally engage with the arm 17.

The carriers 2 comprise struts (shanks) 23 which, in the present case, are arranged substantially parallel with respect to the conveying channel axis 7.

Figure 6:
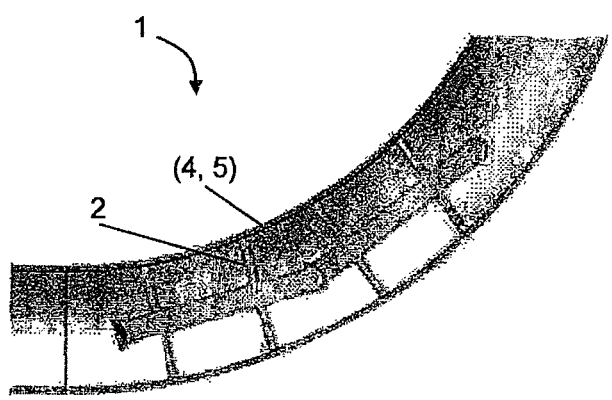
FIG. 6 shows a section of a conveying device of the invention comprising two carriers in a curved conveying channel.

FIG. 6 schematically shows a section of a conveying device having a curved conveying channel with carriers 2 arranged therein.

Figure 7:
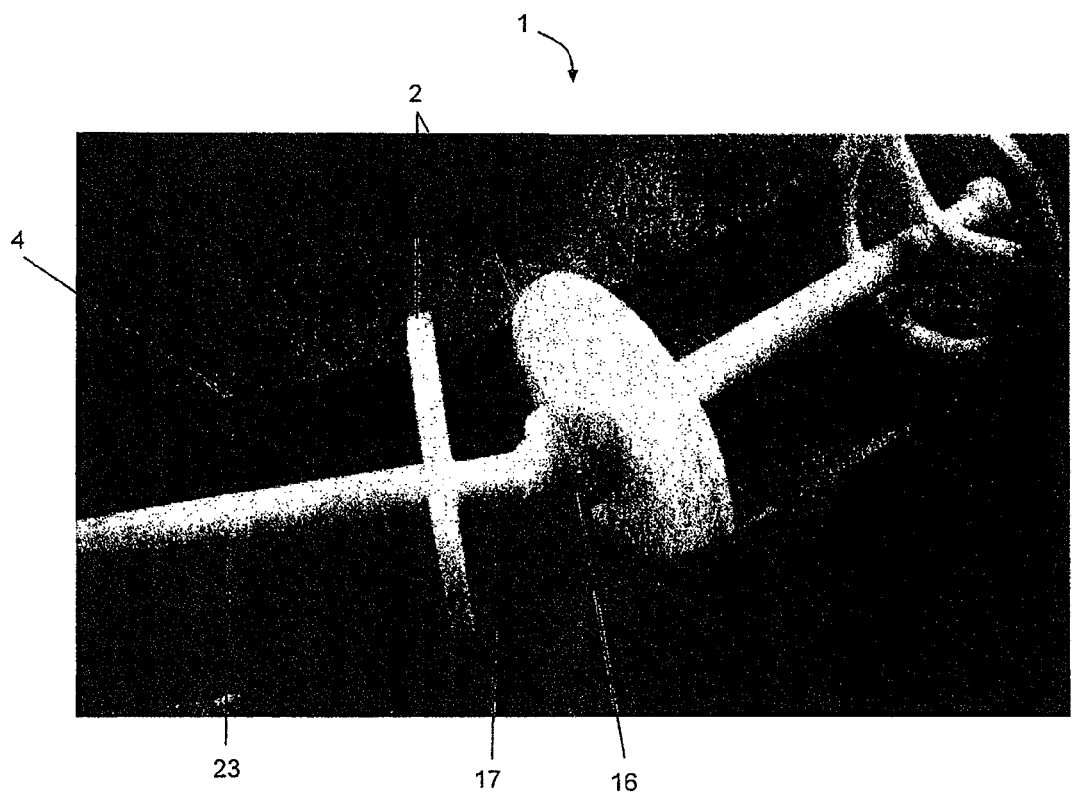
FIG. 7 shows a photographic view of two carriers of the invention being operationally connected in a conveying groove.

FIG. 7 photographically shows a section of a conveying device 1 with a conveying channel 4 which is realized as a conveying groove and in which two carriers 2 with arm 17 and recess 16 are shown in a curved section of the conveying channel.

Figure 8:
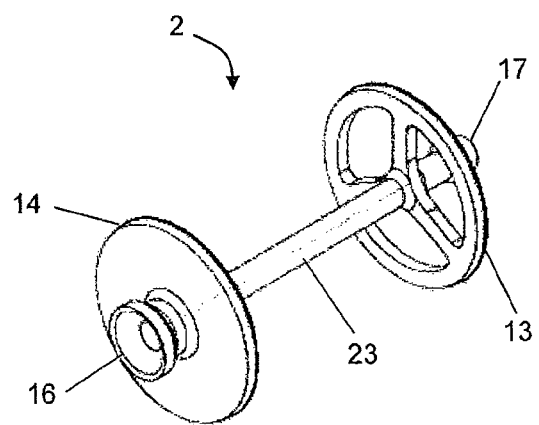
FIG. 8 shows a perspective view of a carrier of the invention.

FIG. 8 is a perspective view of a carrier 2 of the invention.

The carrier 2 according to FIG. 8 comprises an arm 17 which, when being used as intended, is arranged in a conveying channel at the side facing the conveying direction.

The carrier 2 comprises a first surface element 13 which lets bulk goods go through. The carrier 2 further comprises a second surface element 14 which comprises the carrier surface not shown here. The first surface element 13 and the second surface element 14 are arranged in a manner spaced apart from each other by means of a strut (shank) 23 in order to cause an operational connection between the two surface elements.

Moreover, at the side of the second surface element 14 facing away from the conveying direction, the carrier 2 has a recess 16 with which an arm 17 of an adjacently arranged carrier can engage.

Figure 9:
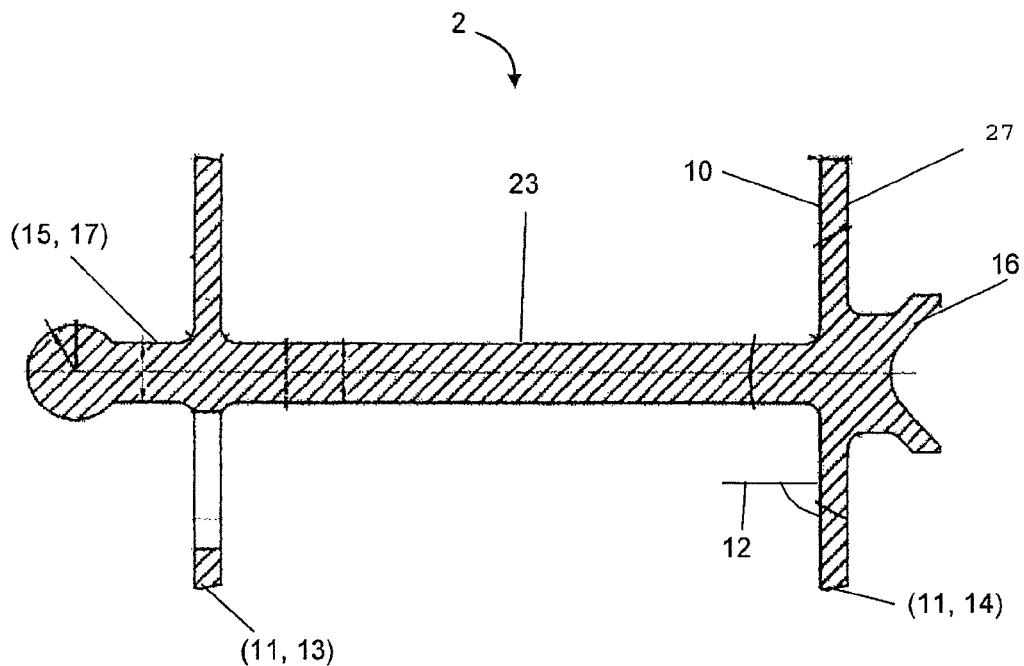
FIG. 9 shows a side view of the carrier according to FIG. 8.

FIG. 9 shows a side view of the carrier 2 of the invention according to FIG. 8.

The carrier 2 comprises a spacer 15 which is formed as an arm 17. The arm 17 is ball-shaped at the end facing away from the carrier 2. At the side facing away from the conveying direction, the carrier 2 has a recess 16 which is ball-shaped in some sections so that the ball-shaped spacer 15 can engage with the complementary recess 16 of a further carrier.

The first surface element 13 and the second surface element 14 are operatively connected to each other by means of the strut (shank) 23, wherein the first surface element 13 and the second surface element 14 act as alignment means 11. The first surface element 13 lets bulk goods go through.

The second surface element 14 comprises at a first side the carrier surface 10 for conveying the bulk goods along the conveying channel and at a second side opposite the first side it comprises a drive surface 27. The drive surface 27 can be elastic and made in particular of plastic or rubber. Alternatively, the drive surface 27 can also be made of steel. The drive can exert a force on this drive surface 27 for driving the carrier 2.

The surfaces enclosed by the circumferences of the first surface element 13 and the second surface element 14 are substantially congruent with respect to each other in case of a projection substantially parallel with respect to the mean surface perpendicular 12, which leads to the desired alignment of the carrier 2 in the conveying channel.

Figure 10:
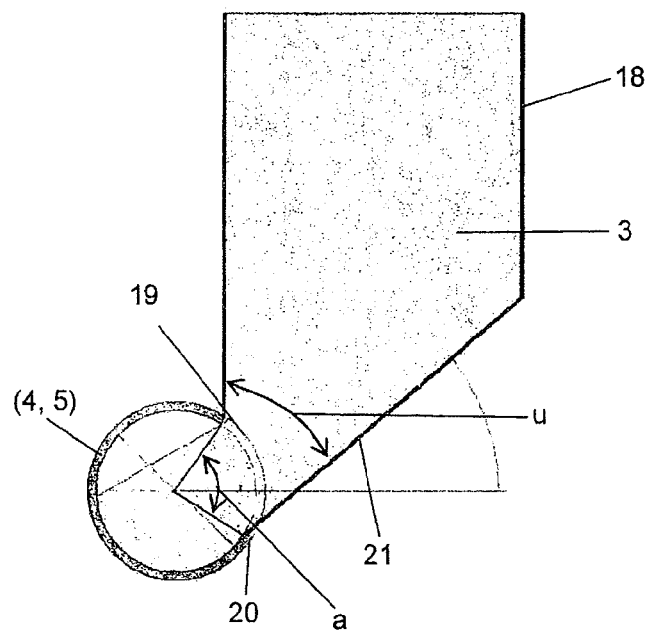
FIG. 10 shows a schematic view of a feeding device of the invention comprising a conveying channel.

FIG. 10 shows a side view of a feeding device 18 of the invention for feeding bulk goods 3 into a conveying pipe 5 of the conveying device.

The conveying pipe 5 has an inlet 19 covering an angular range of about 90°. By means of a slide 20, which is realized as a rotary slide, the angular range a can be adjusted in accordance with the requirements.

The feeding device 18 has a redirecting area 21 which is arranged with a redirecting angle u of about 50° relative to the gravity direction.

Figure 11:
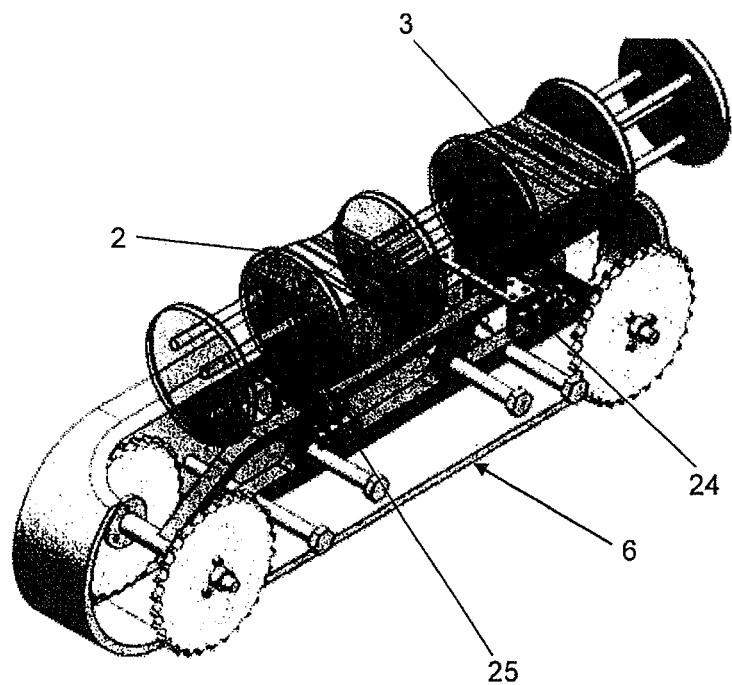
FIG. 11 shows a perspective view of a part of an alternative conveying device of the invention comprising carriers and bulk goods.

FIG. 11 shows a perspective view of a section of an alternative conveying device of the invention. For reasons of clarity, the conveying pipe is not shown here.

A plurality of carriers 2 are arranged in the conveying pipe, wherein in the present case three carriers 2 are visible. By means of a drive chain 24 (only sections thereof are shown) and driving arms 25 arranged thereon, a force can be exerted on the carriers 2 substantially parallel with respect to the conveying channel axis. The carriers 2 do not have spacers. Bulk goods 3 are arranged between the carriers 2, leading to the spacing of the carriers 2 desired in the present case.

Figure 12:
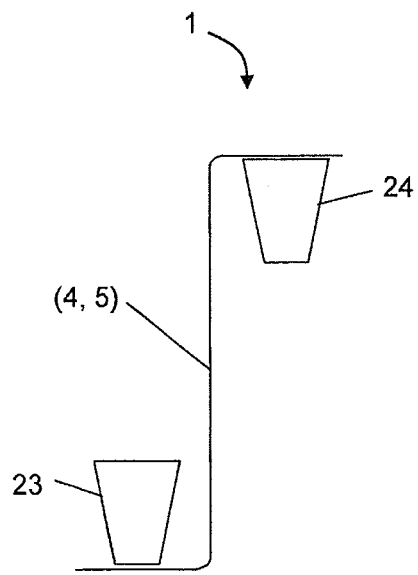
FIG. 12 shows a schematic view of a conveying device comprising an S-shaped conveying pipe.

FIG. 12 shows a schematic side view of a conveying device 1 with a conveying pipe 5. The conveying pipe 5 is S-shaped. In a lower region, an inlet container 23 is arranged for feeding bulk goods conveyed by means of carriers (not shown) to the outlet container 24. The inlet and the outlet are not shown here.

Figure 13A:
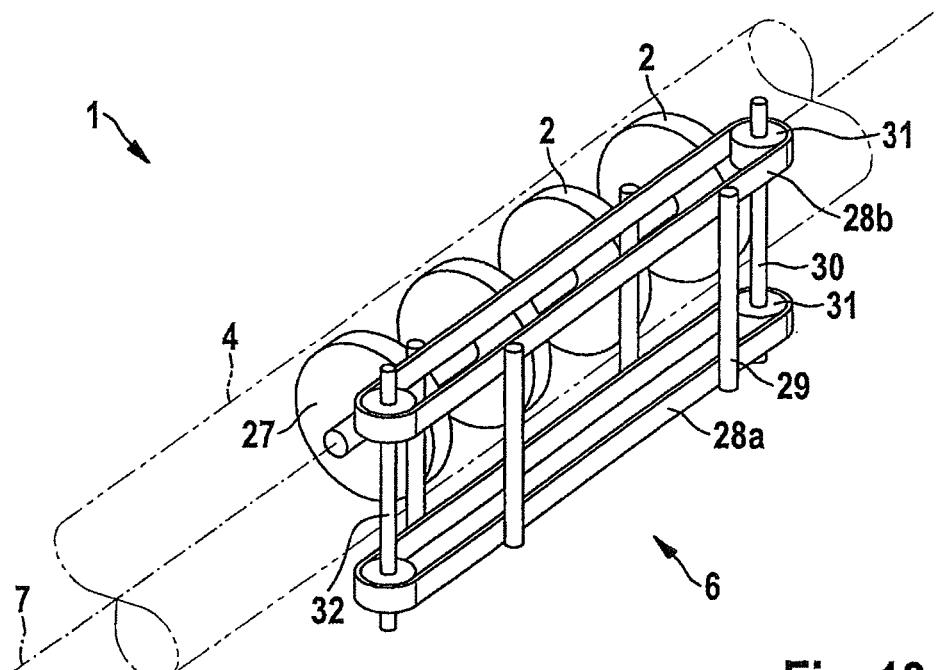
FIG. 13a shows a perspective view of a further embodiment of a conveying device of the invention comprising carrier bolts arranged at a pair of drive chains.
Figure 13B:
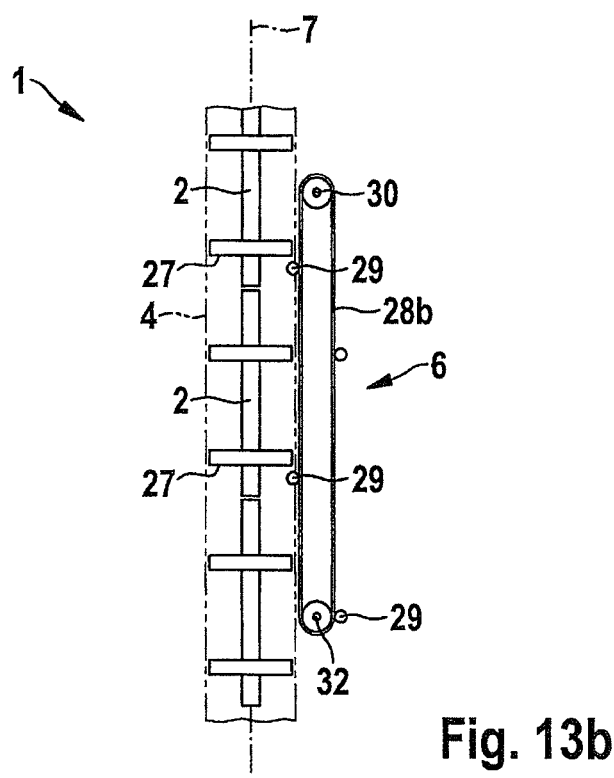

The conveying device 1 according to FIGS. 13*a* and 13*b* comprises a chain drive 6 with a pair of drive chains formed of a lower drive chain 28*a* and an upper drive chain 28*b*. Four carrier bolts 29 are attached to these drive chains 28*a*, 28*b*, wherein the respective lower ends of the carrier bolts 29 are attached to the lower drive chain 28*a* and the upper ends of the carrier bolts 29 are attached to the upper drive chain 28*b*. Hence, the carrier bolts 29 extend in a vertical direction. The two drive chains 28*a*, 28*b* are driven by means of a drive shank 30 and two sprocket wheels 31 attached thereto. At the opposite end, the drive chains 28*a*, 28*b* are redirected by means of a redirecting axis 32. Also more or less than four carrier bolts 29 being attached to the driving chains 28*a*, 28*b* are conceivable.

By rotating the drive shaft 30, the carrier bolts 29 are moved along the conveying channel axis 7. Hence, the carrier bolts 29 come in contact with the drive surfaces 27 of the carriers 2 and thus drive them.

The distance between two adjacent carrier bolts 29 is approx. 1.02 times the extension of the carriers 2 along the conveying channel axis 7 and thus in the meaning of the above definition substantially identical to this extension. It can thus be achieved that the carriers 2 almost contact each other while being driven. However, contact is prevented in order to prevent undesired collisions of adjacent carriers 2. Moreover, the drive section along the conveying channel axis 7 is twice as long as the carriers 2. Hence, at any point in time at least one carrier 2 is completely in the drive section.

Figure 14A:
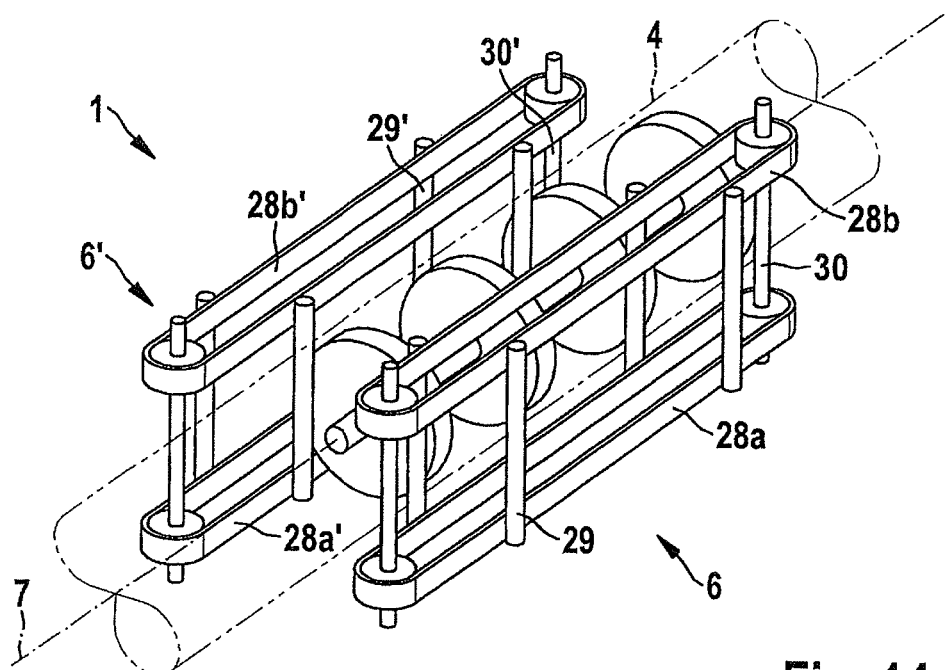
FIG. 14a shows a perspective view of a further embodiment of a conveying device of the invention comprising carrier bolts arranged at two pairs of drive chains.
Figure 14B:
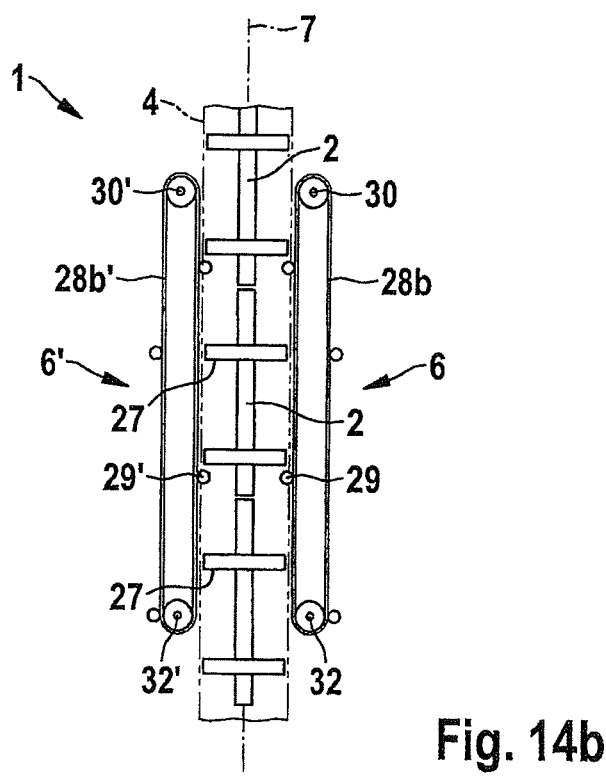

The embodiment shown in FIGS. 14*a* and 14*b* comprises two chain drives 6 and 6' with drive chain pairs 28*a*, 28*b* and 28*a'*, 28*b'*, which each have four respective carrier bolts 29 and 29', respectively. The two drive chain pairs 28*a*, 28*b* and 28*a'*, 28*b'* are arranged at opposite sides of the conveying channel 4. To allow a synchronous movement and a vertical alignment of the carrier bolts 29, 29', the two drive shafts 30, 30' can be driven by a common motor via a gear drive not shown here.

Figure 15A:
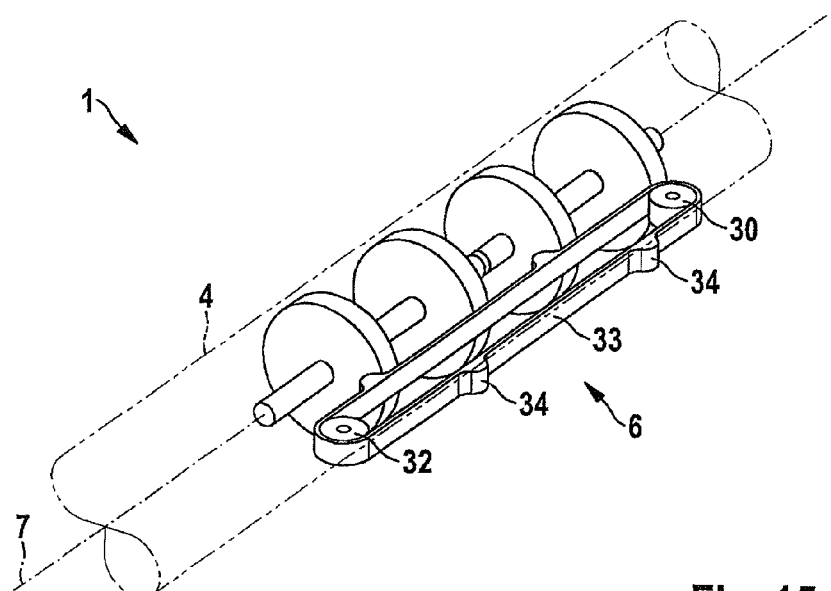
FIG. 15a shows a perspective view of a further embodiment of a conveying device of the invention with carrier projections arranged at a drive chain.
Figure 15B:
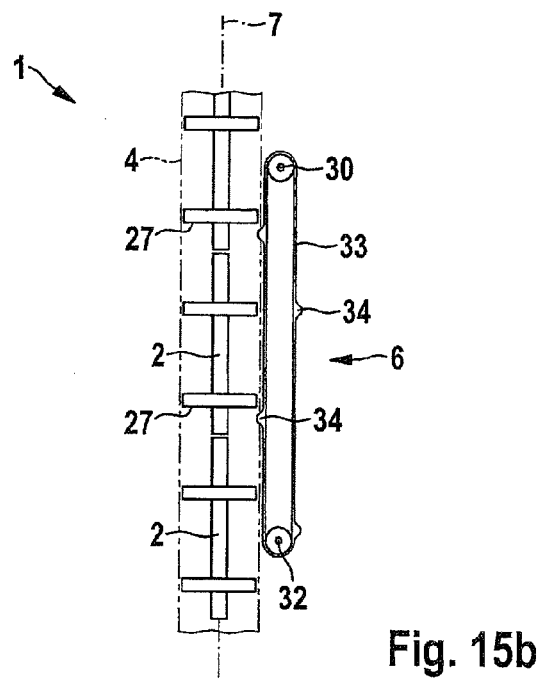

The chain drive 6 of the embodiment according to FIGS. 15*a* and 15*b* comprises a drive chain 33 which is driven by a drive shaft 30 and redirected by a redirecting axis 32. Four carrier projections 34, by means of which the carriers 2 can be driven, are screwed to the drive chain 33. The drive chain 33 is arranged laterally of the conveying channel 4.

The distance between two adjacent carrier projections 34 is approx. 1.02 times the extension of the carriers 2 along the conveying channel axis 7 and thus in the meaning of the above definition substantially identical to this extension. It can thus be achieved that the carriers 2 almost contact each other while being driven. Moreover, also in this example the drive section is twice as long as the carriers 2 along the conveying channel axis 2. Hence, at any point in time at least one carrier 2 is completely in the drive section.

Figure 16A:
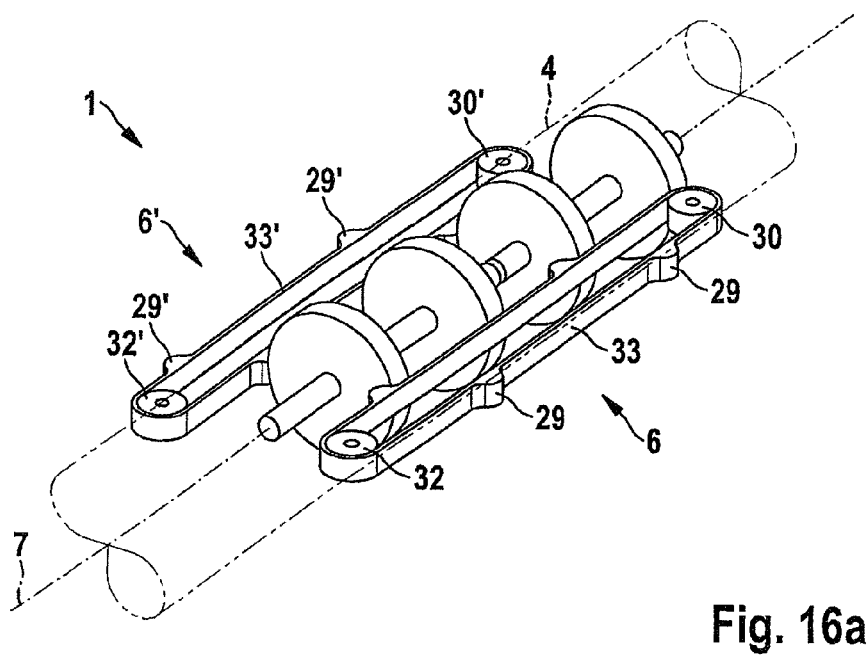
FIG. 16a shows a perspective view of a further embodiment of a conveying device of the invention with carrier projections arranged at two drive chains.
Figure 16B:
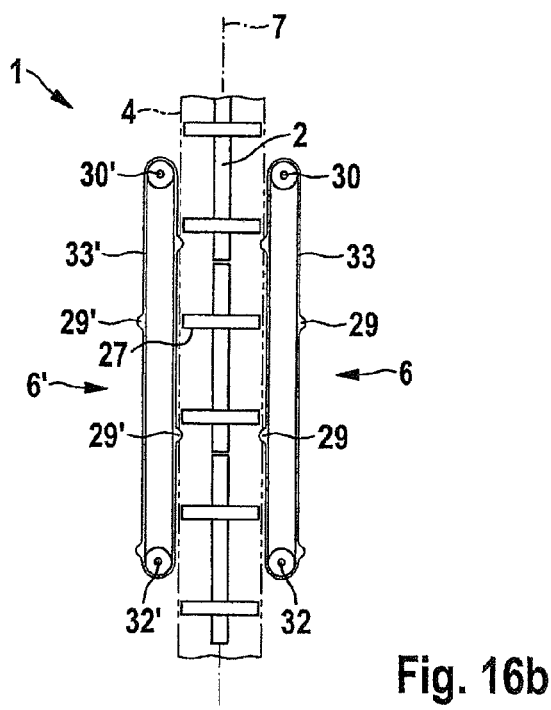

In contrast to FIGS. 15*a* and 15*b*, the conveying device 1 according to FIGS. 16*a* and 16*b* comprises two opposite drive chains 33, 33' with respective drive shafts 30 and 30' and respective redirecting axes 32 and 32' as well as respective carrier projections 34 and 34'. Also in this embodiment, the two drive shafts 30 and 30' can be synchronized by means of a gear drive not shown here.

Figure 17A:
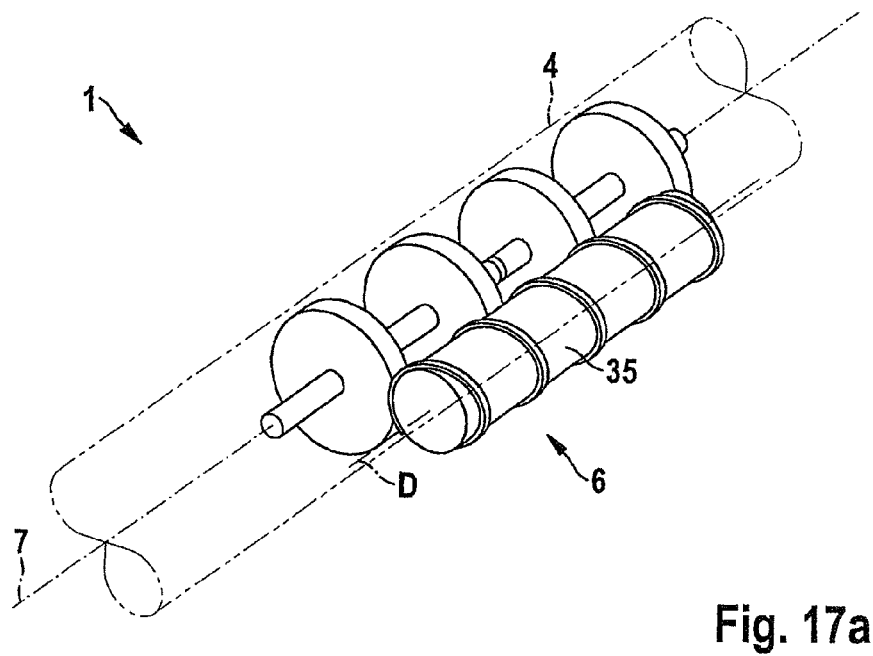
FIG. 17a shows a perspective view of a further embodiment of a conveying device of the invention with a drive worm.
Figure 17B:
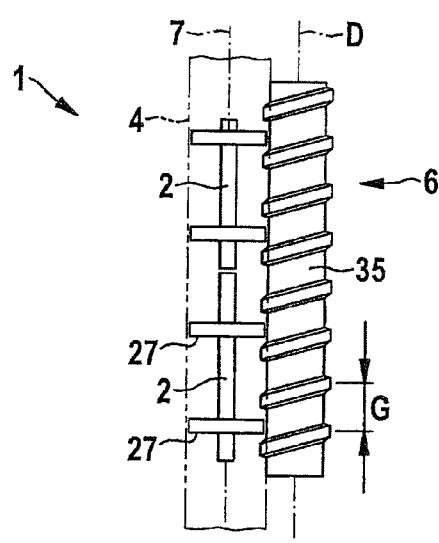

In the embodiment shown in FIGS. 17*a* and 17*b*, the drive is realized as a worm drive 6 with a rotary drive worm 35 whose rotational axis D extends parallel with respect to the conveying channel axis 7. In this embodiment, the carriers 2 are driven by rotating the drive worm 35 about their rotational axis D.

The extension of the carriers 2 along the conveying channel axis 7 is about 3.9 times the pitch G of the drive worm 35. It can thus be achieved that the carriers 2 almost contact each other while being driven.

Figure 18A:
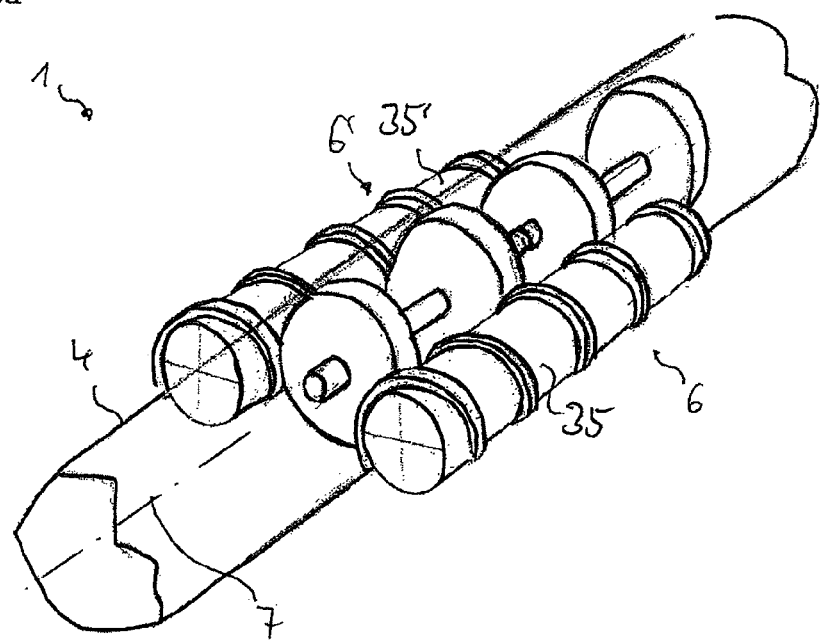
FIG. 18a shows a perspective view of a further embodiment of a conveying device of the invention with two drive worms.
Figure 18B:
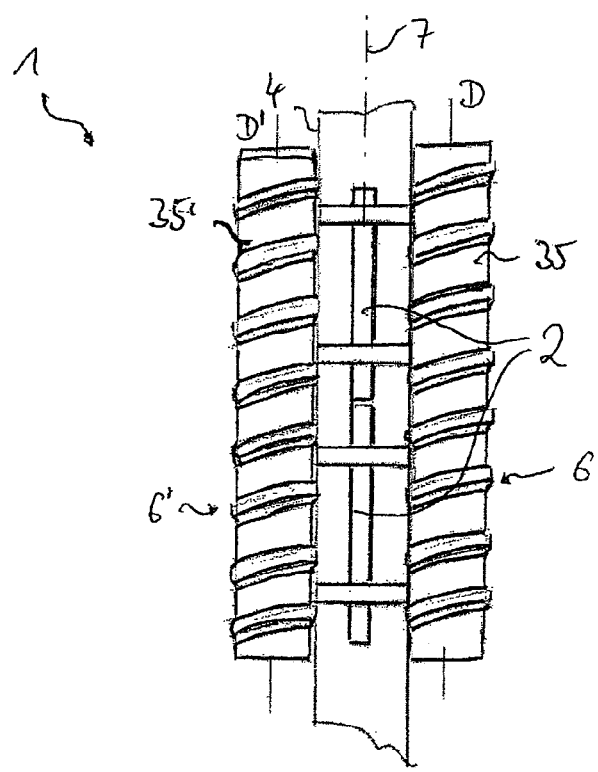

The embodiment shown in FIGS. 18*a* and 18*b* shows two drive worms 35, 35' with respective rotational axes D, D' extending parallel with respect to the conveying channel axis 7. Also here, the two drive worms 35, 35' can be synchronized by a gear drive not shown here.

Figure 19A:
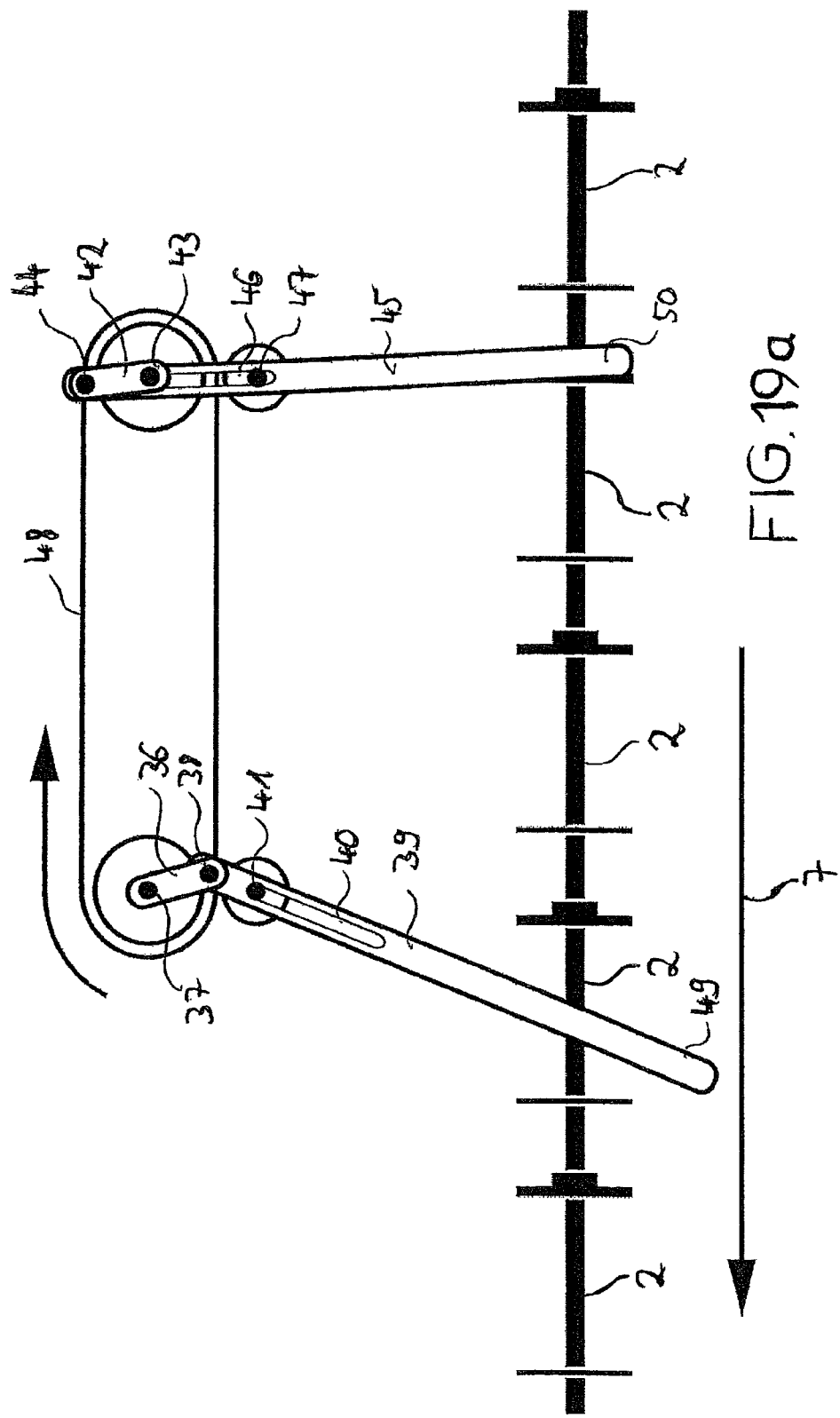
FIG. 19a shows a conveying device with a four bar mechanism at a first point in time.
Figure 19B:
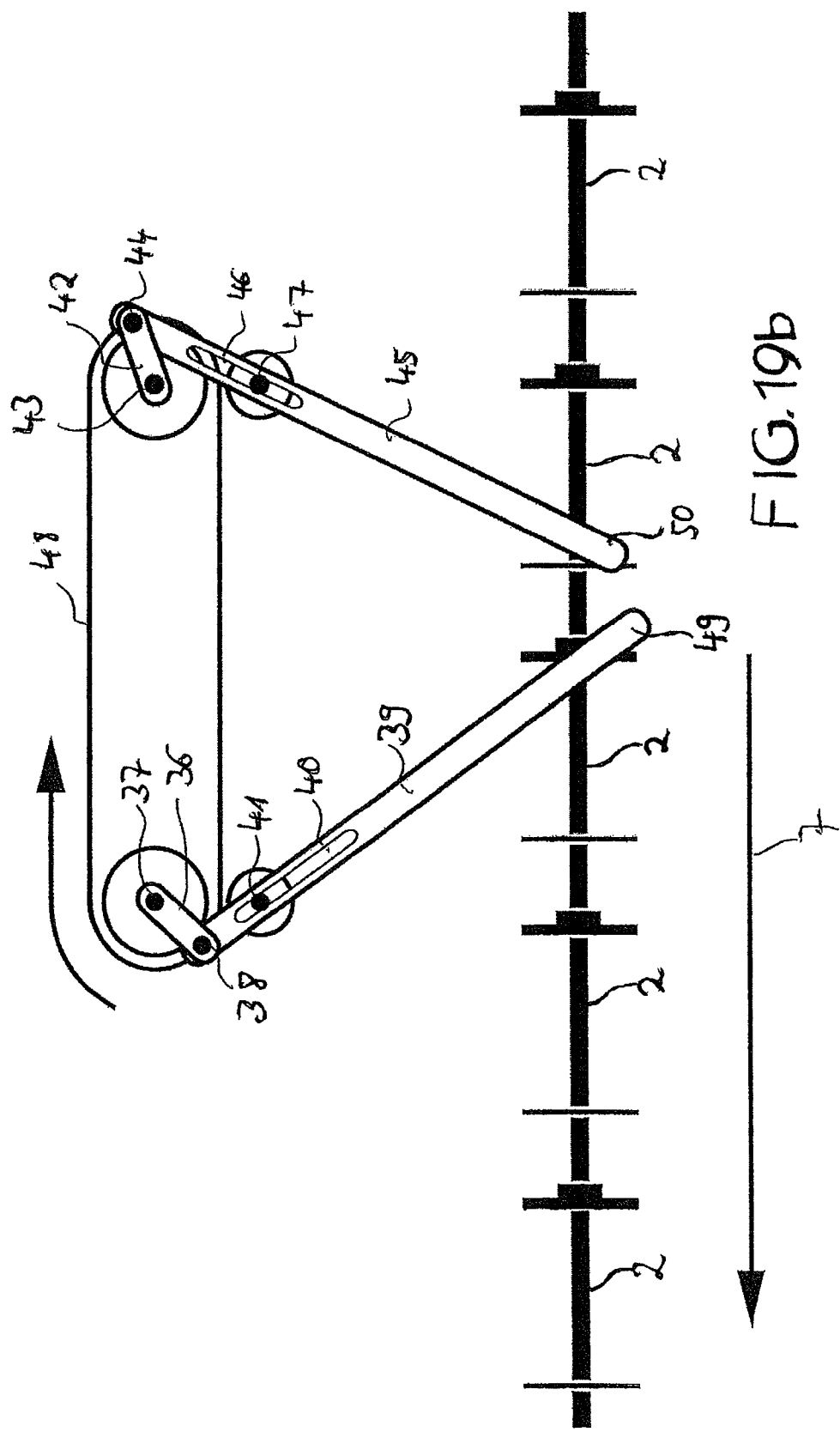
FIG. 19b shows the conveying device according to FIG. 19a at a second point in time.

FIGS. 19*a* and 19*b* show a drive 4 which is realized as a four bar mechanism. A first end of a first lever 36 is attached to a first drive shaft 37, while a second end of the first lever 36 is rotationally connected to a first end of a second lever 39 via a joint 38. The second lever 39 has a slot 40 with which a pin 41 engages so that it becomes possible to guide the second lever 39. Furthermore, a first end of a third lever 42 is attached to a second drive shaft 43, while a second end of the third lever 42 is rotationally connected to a first end of a fourth lever 45 via a joint 44. The fourth lever 45 has a slot 46 with which a pin 47 engages so that it becomes possible to guide the fourth lever 45. The first drive shaft 37 and the second drive shaft 43 are driven by a common drive belt 48 so that a synchronization of the drive shafts 37, 43 is achieved.

FIGS. 19*a* and 19*b* show the drive 6 at two different points in time. The drive 6 is configured and arranged such that in some sections a force can be exerted on carriers 2 parallel with respect to the conveying channel axis 7 by means of a second end 49 of the second lever 39 and a second end 50 of the fourth lever 45 when the drive 6 moves by movement of the drive belt 48. Moreover, the drive 6 is configured and arranged such that the second end 49 of the second lever 39 exerts a force on a first carrier 2 until the second end 50 of the fourth lever 45 starts to exert a force on a second carrier 2 and vice versa. In this embodiment, the drive section has the length of a carrier 2.

Alternatively to the embodiment shown in FIGS. 19*a* and 19*b*, the movement of levers can also be controlled by at least one connecting member, preferably at least two connecting members, which either guides the levers with perpendicularly movable carrier bolts directly across the carrier or is indirectly placed in the drive.

The present invention thus comprises, i.a., the following aspects:

1. A conveying device (1) comprising a conveying channel (4), in particular a conveying pipe (5), at least one carrier (2) arranged in the conveying channel (4), in particular at least two carriers (2), and at least one drive (6) for driving the at least one carrier (2) for conveying bulk goods (3) along a conveying channel axis (7), characterized in that the at least one carrier is loosely arranged in the conveying channel (4) at least in some sections along the conveying channel axis (7).
2. The conveying device (1) according to aspect 1, characterized in that the conveying channel (4) is formed as a guide means along the conveying channel axis (7) for the carrier (2).
3. The conveying device (1) according to aspect 1 or 2, characterized in that the drive (6) is configured such that at least in some sections a force can be exerted by the drive (6) directly on the carrier (2) substantially parallel with respect to the conveying channel axis (7).
4. The conveying device (1) according to any of aspects 1 to 3, characterized in that the drive (6) reaches into the conveying channel (4) at least in a drive section (8) for exerting a force substantially parallel with respect to the conveying channel axis (7) on a carrier (2) arranged in the drive section (8).
5. The conveying device (1) according to any of aspects 1 to 4, characterized in that the drive (6) can be selected or is selected from the list of the following kinds of drives or any combinations thereof: chain drive, belt drive, coupler mechanism, gear drive, worm drive, magnet drive, servo drives, direct drives.
6. The conveying device (1) according to any of aspects 3 to 5, characterized in that the drive (6) comprises at least one carrier bolt (29, 29') by means of which a force can be exerted at least in some sections directly on the carrier (2) substantially parallel with respect to the conveying channel axis (7).
7. The conveying device (1) according to aspect 6, characterized in that the drive is configured as a chain drive (6) and comprises at least one drive chain pair (28*a*, 28*b*; 28*a'*, 28*b'*), wherein each of two opposite ends of the carrier bolt (29, 29') is attached to a respective drive chain (28*a*, 28*b*; 28*a'*, 28*b'*) of the drive chain pair (28*a*, 28*b*; 28*a'*, 28*b'*).
8. The conveying device (1) according to any of aspects 3 to 7, characterized in that the drive is configured as a chain drive (6) and comprises at least one drive chain (33, 33') having at least one carrier projection (34, 34') by means of which a force can be exerted at least in some sections directly on the carrier (2) substantially parallel with respect to the conveying channel axis (7).
9. The conveying device (1) according to any of aspects 3 to 8, characterized in that the drive is configured as a worm drive (6) and comprises at least one rotary drive worm (35, 35') by the rotational movement of which a force can be exerted at least in some sections directly on the carrier (2) substantially parallel with respect to the conveying channel axis (7).
10. The conveying device (1) according to any of the preceding aspects, characterized in that a force transmission between two carriers (2) adjacently arranged in the conveying channel (4) parallel with respect to the conveying channel axis (7) can be achieved by a direct contact between the carriers (2) and/or by bulk goods arranged between the carriers (2) in the conveying channel.
11. A carrier (2) for conveying bulk goods (3) in a conveying device (1) according to any of the preceding aspects, comprising a carrier surface (10), characterized in that the carrier (2) comprises an alignment means (11) for aligning the mean surface perpendicular (12) of the carrier surface (10) at least in some sections substantially parallel with respect to the conveying channel axis (7).
12. The carrier (2) according to aspect 11, characterized in that when aligning the mean surface perpendicular (12) of the carrier surface (10) substantially parallel with respect to the conveying channel axis (7), the carrier surface (10) covers the mean conveying channel cross-section to an extent of less than 100%, preferably in the range of 50% to 99.9% and particularly preferably of 80% to 99.9%.
13. The carrier (2) according to aspect 11 or 12, characterized in that the alignment means (11) is configured at least as a first surface element (13) and a second surface element (14) which are spaced from each other substantially parallel with respect to the conveying channel axis (7) and which are arranged so as to be operatively connected to each other, wherein the mean surface perpendiculars (12) of the surface elements are arranged substantially parallel with respect to the conveying channel axis (7).
14. The carrier (2) according to aspect 13, characterized in that the first surface element (13) facing the conveying direction of the bulk goods (3) lets the bulk goods (3) go through, wherein in particular the second surface element (14) comprises the carrier surface (10).
15. The carrier (2) according to any of aspects 11 to 14, characterized in that at the side facing and/or facing away from the conveying direction, the carrier (2) comprises a spacer (15), in particular an arm (17) arranged substantially parallel with respect to the conveying channel axis (7), which is in particular ball-shaped or dome-shaped at the end facing away from the carrier (2).
16. The carrier (2) according to aspect 15, characterized in that at the side facing or facing away from the conveying direction, the carrier (2) comprises a recess (16) which is formed such that the spacer (15) can engage with the recess (16), wherein the recess (16) is in particular funnel-shaped and wherein the recess (16) is preferably at least in sections ball-shaped and/or at least in sections parabolic.
17. A method for conveying bulk goods (3) by using a conveying device (1) according to any of aspects 1 to 10, optionally with a carrier (2) according to any of aspects 11 to 16, further optionally with a feeding device (18), comprising the step of conveying the bulk goods (3) from an inlet (19) to an outlet (22).
18. A method for upgrading and/or converting or refitting a conveying device (1) for conveying bulk goods (3), comprising the step of mounting at least one carrier (2), in particular a carrier (2) according to any of aspects 11 to 16, for building a conveying device (1) according to any of aspects 1 to 10, and optionally the step of mounting a feeding device (18).

For example also on the basis of the above basic explanations, general definitions and features as well as the explanations of the drawings, the present invention starts out from the basic idea that bulk goods are conveyed in a conveying channel, e.g. a conveying pipe, by conveying elements which are pushed or pressed in the conveying channel in the conveying direction and thus move the bulk goods through the conveying channel. The conveying elements are separate individual bodies or (bulk goods) carriers which, e.g., during the conveying of bulk goods in the conveying channel are (only) non-positively (in a force-fit or force-locked manner) connected to each other. For example, in the sections of the conveying channel in which there is no mechanical drive means, a conveying element moving in the conveying channel in the conveying direction can be configured such that it pushes or presses a conveying element located downstream thereof through the conveying channel.

The basic concept in which the pressure of a separate individual body as conveying element is transferred to the conveying element being next in the conveying direction is characterized in view of known tube or pipe chain conveyors by its improved energy efficiency, increased conveying speed and performance, better hygiene and a smoother conveying of the bulk goods. In this connection, the increased energy efficiency is achieved, e.g., by a very low-friction transport as compared to tube or pipe chain conveyors. Moreover, because of the specific configuration of the conveying elements it is possible that only one drive means is necessary, which is provided in particular in a first section of the conveying channel and thus does not come in contact with the bulk goods which are fed into the conveying channel only in a second section thereof. In accordance with the concept of the invention, it is additionally possible to provide a conveying element and a conveying device which can be used for conveying different bulk goods such as rice, flour, grains, corn and wheat. For example, so far tube or pipe chain conveyors have been used for rice, bucket conveyors for flour, and elevator conveyors for grains, but they are excluded at least for transporting rice because of the explosion protection problems, the risk of accidents due to crushing and shearing points and due to lack of space and for cost reasons. On the other hand, the tube or pipe chain conveyors could meet the requirements for rice applications to some extent, but a tube or pipe chain conveyor is excluded for flour for hygiene reasons and for grains for reasons of the conveying performance. By means of the present invention, all these bulk goods can be conveyed easily and without problems, hygienically and highly efficiently.

The invention achieves the above-mentioned objects by means of the features of the claims.

For this purpose, the present invention relates to a conveying element, in particular to be used in one of the methods described above and/or in the following and/or in one of the conveying devices described above and/or in the following, and to a conveying device for conveying bulk goods.

A conveying element according to the invention comprises a disk element (e.g., a "second surface element" as described above), e.g. as scraper disk, comprising an upper side ("carrier surface"), a lower side and a side surface along the circumference of the disk element and a side surface along the circumference of the disk element and a shank ("strut") which has, e.g., a shank head, in particular a ball or dome head, at its upper end (upper end area) and is then connected to the upper side of the disk element, e.g. at its lower end (lower end area). For example, the upper side of the disk element can be centrally connected to the lower end of the shank. The conveying element comprises a means for receiving the shank head, in particular a ball head receipt or dome head receipt, e.g., at the lower side of the disk element. In accordance with an embodiment, the shank head receipt can be provided at the shank itself. For example, in the case in which the lower end of the shank comprises the shank head, the shank head receipt can be provided at the upper end of the shank. According to the invention, the side surface of the disk element is inclined at least in sections relative to the longitudinal axis of the shank.

The longitudinal axis of the shank can extend, for example, through the center of the upper side of the disk element. In particular, the shank is arranged perpendicularly relative to the disk element. The disk element can serve as scraper disk of the conveying element, which pushes the bulk goods through the conveying channel and is in particular suitable for absorbing the pushing movement of a drive means (e.g., with carrier bolts as described above). The shank of the conveying element serves the purpose of transferring the forces introduced by the drive means to the scraper disk towards the shank head and thus further to a downstream conveying element in the conveying channel in order to press/push the bulk goods in this manner through the conveying channel.

In accordance with an embodiment, the disk element can be a radially-symmetric intrinsically bent disk. In this case, the upper side and the lower side of the disk element can also be bent, e.g. the upper side of the disk element in such a manner that the distance in the longitudinal direction between the center of the upper side and the shank head is larger than the distance in the longitudinal direction between the (maximum) circumference of the upper side of the disk element and the shank head. The side surface of the disk element extends along the (maximum) circumference of the disk element and connects in particular the upper side to the lower side of the disk element via an upper and a lower circumferential edge.

According to the invention, in a longitudinal section of the conveying element through the longitudinal axis of the shank, the side surface of the disk element is inclined at least in sections relative to the longitudinal axis of the shank (in the direction of the center of the upper side of the disk element). In particular, sections of the side surface at the upper circumferential edge have such an inclination relative to the longitudinal axis of the shank. By the at least section-wise inclination of the side surface relative to the longitudinal axis of the shank, damage to the disk element can be reduced if the latter comes in contact with, e.g., abutting edges of pipes in the conveying channel.

In accordance with an embodiment, an inclined section of the side surface of the disk element is configured as side surface of a centering rail of the disk element or as side surfaces of centering cams. A centering rail extends, e.g., along the circumference of the upper side of the disk element and does not only prevent damage to the conveying element, in particular the scraper disk, but can additionally also serve the purpose of aligning the conveying element optimally in the conveying channel cross-section and in particular counteracting tilting of the conveying element if it comes in contact with abutting edges of pipes. As an alternative to a centering rail, e.g., centering cams can be provided along the circumference of the upper side of the disk element.

In accordance with an embodiment, the edge of the disk element located between the side surface and the upper side of the disk element, i.e. the upper circumferential edge of the side surface, is rounded more than the lower circumferential edge (this is the edge of the side surface located between the side surface and the lower side of the disk element), e.g., in order to prevent damage to the scraper disk when it comes in contact with abutting edges of pipes. An edge is rounded more if the radius of the bow section representing the rounded upper circumferential edge in a longitudinal section of the conveying element through the longitudinal axis of the shank is larger than the radius of the bow section of the lower circumferential edge. A longitudinal section of a conveying element through the longitudinal axis of the shank is shown, e.g., in FIG. 1 (in an exemplary embodiment with centering cam).

According to the invention, the conveying element comprises a means for receiving the shank head. In accordance with an embodiment, the disk element can have an indentation/recess, e.g., at its lower side, into which a shank head of a shank of an upstream conveying element can be received. The indentation can in this case be configured complementary with respect to the shank head end, wherein the radius of the indentation can, for practical reasons, be slightly larger (e.g. by 1 mm to 15 mm, in particular 2 mm to 8 mm, for example about 3 mm to 5 mm larger) than the radius of the shank head so that the shank head end of a downstream conveying element can be received more easily by the shank head receipt. In accordance with an embodiment, e.g., the shank head end can be provided at the lower side of the disk element, and the other end of the shank has, e.g., the shank head receipt formed complementary with respect to the shank head, so that a shank head can be received at the lower side of the disk element of the conveying element by the shank head receipt of a downstream conveying element.

In accordance with an embodiment, the shank can extend centrally through the disk element and can form a shank head receipt or a shank head at the lower side of the disk element. In both cases, e.g., the diameter of the shank can be slightly larger (e.g. 2 mm to 30 mm, in particular 4 mm to 16 mm, for example 6 mm to 10 mm larger) than the diameter of the shank head end, so that the shank head receipt at the shank comprises an accordingly suitable indentation (having the sizes defined above) for a shank head end of an upstream or downstream conveying element.

In accordance with an embodiment, the conveying element is made completely of plastic and is in particular formed integrally (e.g. by injection molding). However, for specific bulk goods it can be advantageous to use heavier, more dimensionally stable conveying elements which then have, e.g., a metal core and/or a core of a metallic alloy such as, e.g., steel. In accordance with an embodiment, the core is, e.g., no magnet. For example, the core can be only in the shank or in the shank and in the scraper disk. The outer surfaces of this embodiment, in particular all areas of the conveying element around the core, can then be made again of plastic and can in particular be formed integrally. For example, a conveying element of this kind can be made by placing the core in a corresponding mold, wherein the mold has the shape of the conveying element to be produced, and then the respective injection molding process can be carried out so that the core is located in the finished product within the conveying element and the outer surfaces of the conveying element are formed integrally.

In accordance with an embodiment, the disk element comprises a wear display which is arranged, e.g., at the side surface of the disk element and/or in the disk element at a specific distance from the upper surfaces of the disk element. If the side surface or the upper side of the disk element by means of which the bulk goods are transported through the conveying channel is accordingly worn off, e.g., markers can become visible in a wear display located in the disk element, said markers showing the degree of wear, e.g., by a corresponding color gradient from the outside to the inside in the disk element. Alternatively or additionally, a wear display body having a specific shape (e.g. a two-sided arrow) can be integrated in the disk element and can have in particular a different color than the material surrounding it. In this case, the degree of wear can be noticed as specific portions of the wear display body become visible (e.g., at the beginning only the head of the arrow viewed from the front, i.e. a small point, which becomes larger during operation as the wear increases). Alternatively or additionally, a wear display can be realized by a marker at the outside of the side surface of the conveying element which, e.g., extends partly into the interior of the disk element by a well-defined length. If the marker is no longer visible during operation, e.g., it can thus be determined that the conveying element that is worn too much has to be replaced.

In accordance with an embodiment, the conveying element comprises a guide disk element ("first surface element" as described above) which is arranged substantially parallel to the disk element in the direction of the shank head of the shank. In particular, the shank extends through the center of the upper side of the guide disk element. The guide disk element comprises in particular openings/recesses so that the guide disk element lets bulk goods go through. In this manner, the conveying volume can be increased and the bulk goods are not crushed in the conveying channel bows. Moreover, the guide disk element can be configured such that it guides the conveying element such in the conveying channel that when the conveying element leaves the non-positive conveying element connection of upstream and downstream conveying elements, it finds back into the shank head receiving means of the upstream conveying element and thus reestablishes the connection. Similar to the disk element, also the guide disk element can have a radially symmetric shape and can in particular be an intrinsically bent disk. In accordance with an embodiment, the guide disk element can be inclined relative to the disk element and/or can be intrinsically flexible and/or can be flexibly attached to the shank. It is thus possible to compensate for, e.g., pressure differences on the guide disk element during transportation of the bulk goods through the bow section in the conveying pipe: The guide disk element can, e.g., be configured such that it is, e.g., deflected/tilted towards one side, e.g., if the bulk goods to be pushed through the conveying pipe are compacter at one side (e.g. the inner side of the pipe bow) than at another side (e.g. the outer side of the pipe bow).

In accordance with an embodiment, the distance in the longitudinal direction between the scraper disk and the guide disk of a conveying element is larger than half the length of the conveying element in the longitudinal direction. By means of such an arrangement of the disk elements in which the guide disk element is provided close to the shank head, the guide disk element can, when leaving the connection, quickly reestablish the non-positive connection to the upstream conveying element by centering the shank head within the cross-section of the conveying channel.

In accordance with an embodiment, the conveying element comprises at least one camera and/or at least one sensor (e.g. a temperature sensor and/or a humidity sensor) and/or at least one lighting device which illuminates the area which, e.g., the camera can cover. For example, the system of cameras and lighting devices arranged at the conveying element can be used for inspecting the conveying pipe, in particularly in sections which are not easily accessible. For example, the conveying element can comprise a respective camera and lighting device at its front end in the conveying direction and at its rear end in the conveying direction. For example, 2 or 4 or 6 cameras/sensors and/or a corresponding number of lighting devices can be arranged at the shank of the conveying element for illuminating and inspecting, e.g., the inner wall of the conveying pipe. Possible malfunctions or leaks can in this manner be localized and identified quickly and thus be eliminated or repaired quickly without having to disassemble the entire conveying channel. For example, the conveying element can be inserted into the conveying device during ongoing operation and is transported, e.g., one round through the conveying channel, wherein the conveying element records data on the basis of which then the state as to wear (e.g. by wear markers in the critical places of the conveying channel), hygiene, dirty areas, abutting edges of the pipes, product inlet and product outlet can be analyzed. Alternatively or additionally, the conveying element can comprise one or more sensors such as an ultrasonic probe, e.g., in order to measure the pipe wall thickness and thus control the state of the conveying pipe.

In accordance with an embodiment, the conveying element has a cleaning device which is arranged in particular at the shank of the conveying element. The cleaning device can be one or more brushes or fiber facings for mechanically cleaning the inner pipes of the conveying device. The conveying element with the cleaning device can be inserted into the conveying device during ongoing operation and is then transported one or more rounds through the conveying channel in order to clean the conveying channel. It is advantageous that the conveying element can be removed easily from the conveying device after cleaning of the inner pipes and can then be decontaminated separately. The cleaning device can comprise, e.g., depending on the bulk goods to be conveyed, e.g., plastic brushes, steel brushes, stainless steel brushes, brass brushes, microfiber fabrics, rubber, felt, wool, cotton, etc.

In accordance with an embodiment, the conveying element is provided with a label for automatic identification and/or localization. A conveying device of the invention comprises, e.g., a reader for reading out the label. In particular, the label can be an RFID transponder with a code which can be read out by the reader, e.g., at one or more places in/at the conveying channel, e.g., through a viewing window or another opening. In this manner, e.g., starting or stopping operations can be controlled, e.g., the conveying device can be configured such that it starts (only) when a (specific) conveying element has been identified at a specific place, and/or stops as soon as a (specific) conveying element has been pushed to a specific place. For example, a well-defined number of cycles can thus be predefined in the conveying device and/or conveying of the bulk good can be stopped as soon as a non-identifiable conveying element is located in the conveying channel.

In the following, further features and advantages of the invention will be discussed in more detail for a better comprehension on the basis of embodiments in connection with FIGS. 20 to 25.

Similar to the embodiments in FIGS. 5 to 9, FIGS. 20 to 25 show views of further embodiments of specific conveying elements.

Figure 20:
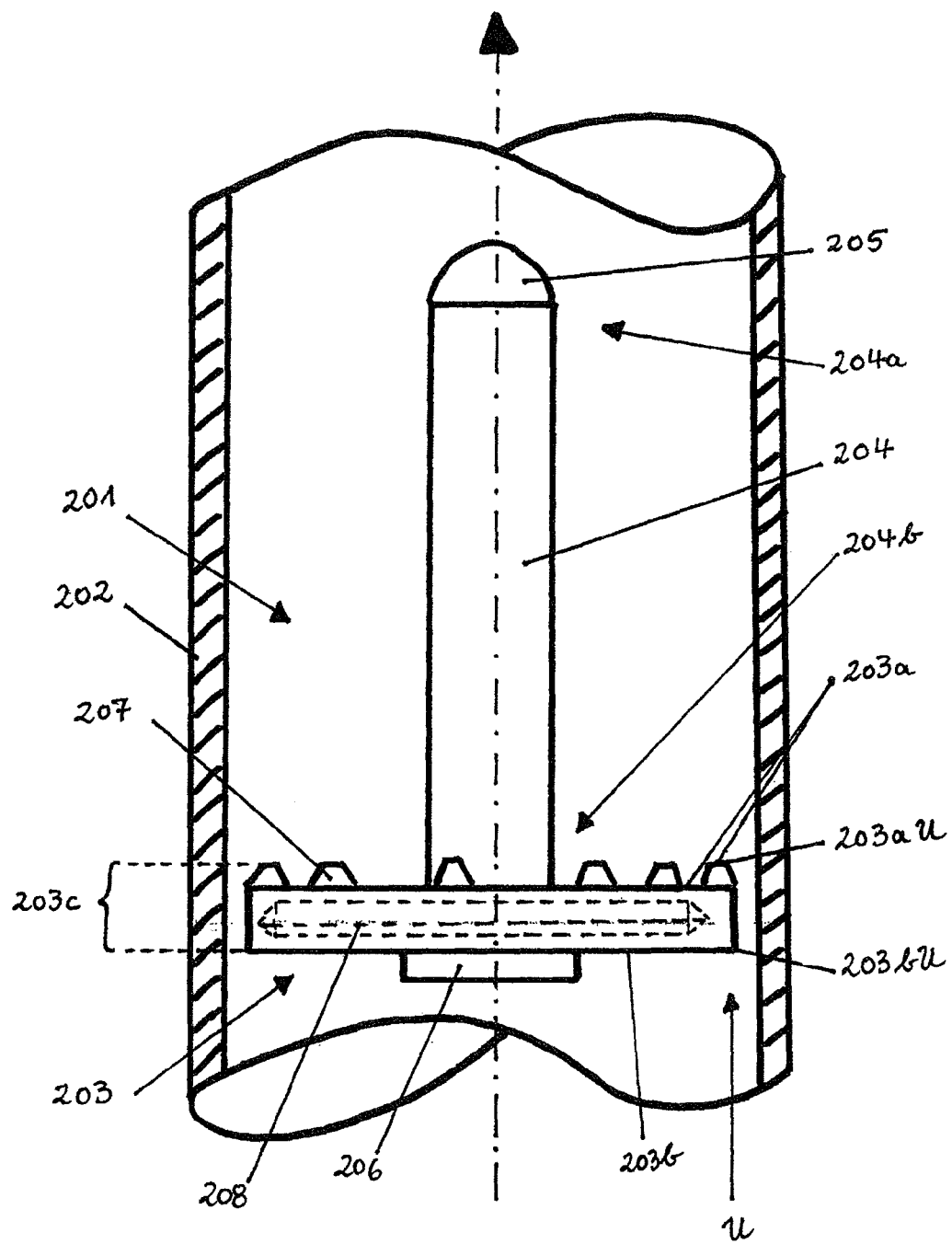
FIG. 20 shows a view of a conveying element according to an embodiment of the invention in a conveying channel.

FIG. 20 is a schematic view of a longitudinal section of the conveying element 201 through the longitudinal axis of the shank 204 of the conveying element 201. The conveying element 201 has a disk element 203 with an upper side 203a, a lower side 203b and a side surface 203c along the (maximum) circumference U of the disk element 203. The side surface 203c connects the upper side 203a with the lower side 203b of the disk element 203 via an upper circumferential edge 203aU and a lower circumferential edge 203bU. The shank 204 comprises at its upper end 204a (the front end of the shank in the conveying direction, wherein the conveying direction is indicated at the top of the longitudinal axis of the shank by an arrow or arrowhead) a shank head, in this example a ball head 205 and is centrally connected with the upper side 203a of the disk element 203 at its lower end 204b (the rear end of the shank in the conveying direction). The conveying element 201 moreover comprises a means 206 for receiving the shank head at the lower side 203b of the disk element 203. The side surface 203c of the disk element 203 is inclined at least in sections relative to the longitudinal axis 204c of the shank 204, in the embodiment shown in FIG. 20 these sections of the side surface 203c relate to the side surfaces of the centering cams 207. For clarity reasons, FIG. 20 does not only show the (outer) centering cams visible in the longitudinal section but also further centering cams which are arranged in an equally spaced manner in the circumferential direction. The conveying element 201 can moreover have a wear display 208, e.g., in and/or at the disk element 203.

Figure 21A:
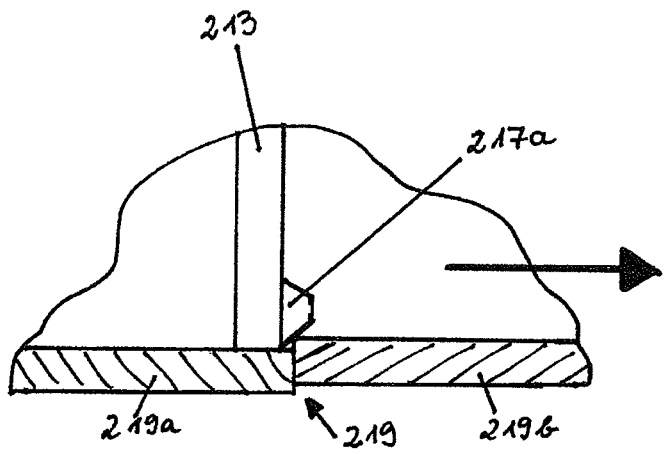
FIG. 21a shows a detailed view of the conveying element according to the embodiment of FIG. 20.
Figure 21B:
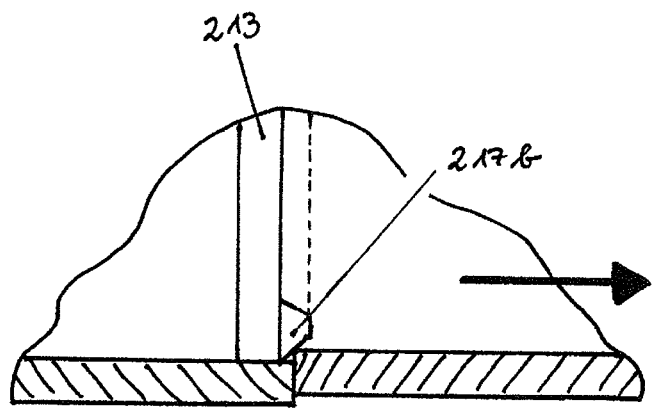
FIG. 21b shows a detailed view of a conveying element according to an embodiment of the invention.
Figure 21C:
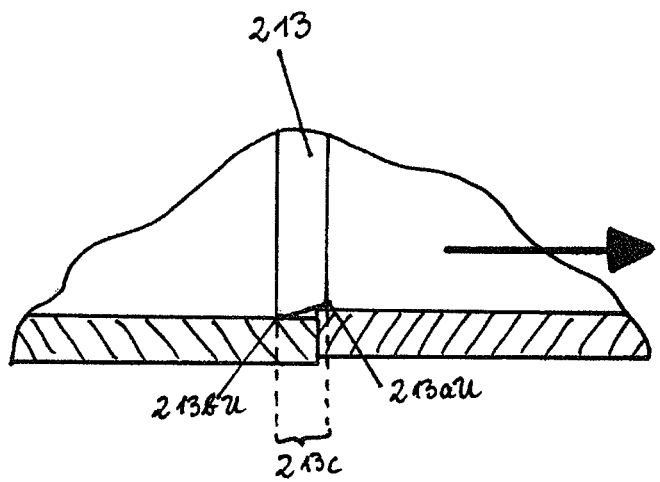
FIG. 21c shows a detailed view of a conveying element according to an embodiment of the invention.

FIGS. 21a, 21b and 21c show detailed views of three embodiments of a disk element 213.

In the first embodiment according to FIG. 21a, the disk element 2013 comprises centering cams 217a which protect the disk element 213 from abutting edges 219 between two pipe elements 219a and 219b during transport of the conveying element in the conveying channel in the conveying direction (see arrow). In the second embodiment according to FIG. 21b, the disk element 213 has a centering rail 217b which extends along the entire circumference of the disk element 213 (in FIG. 21b indicated by the dashed line as a delimitation against the centering cams in FIG. 21a). In the third embodiment according to FIG. 21c, the side surface 213c is inclined from the lower circumferential edge 213bU to the upper circumferential edge 213aU as protection against the abutting edges described above.

Figure 22:
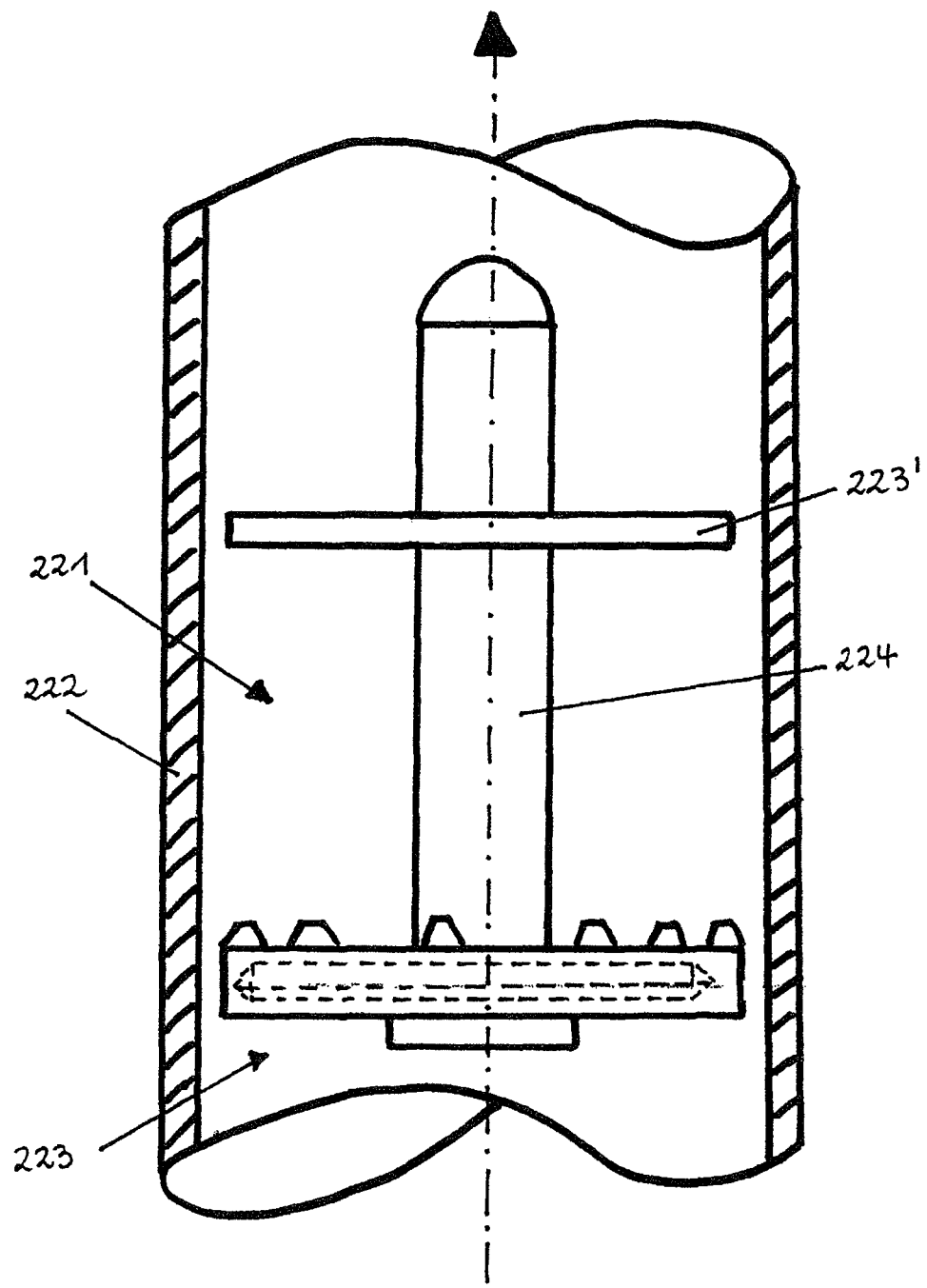
FIG. 22 shows a view of a conveying element according to an embodiment of the invention in a conveying channel.

FIG. 22 is a schematic view of a longitudinal section through a conveying element 221 in a conveying channel 222 and comprises in particular the same features as FIG. 20. In addition, the shank 224 comprises a guide disk element 223' parallel to the disk element 223. The guide disk element 223' can have openings/recesses (not shown) for increasing the conveying volume and avoiding crushing of the bulk goods.

Figure 23:
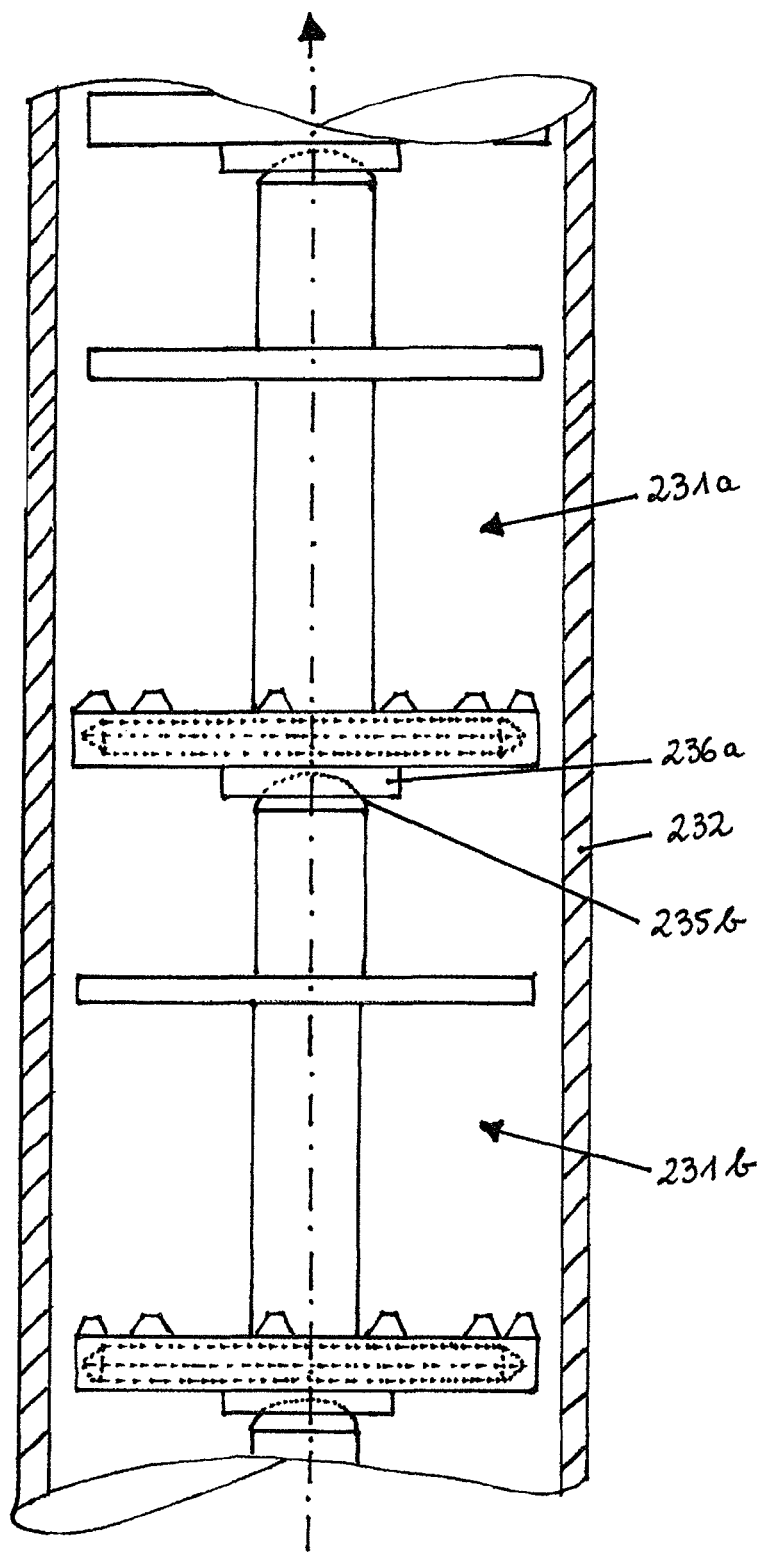
FIG. 23 shows a view of a conveying channel comprising a plurality of conveying elements of the invention.

FIG. 23 exemplarily shows two conveying elements 231a and 231b in a conveying channel 232, which are connected, i.e. the ball head 235b of the conveying element 231b engages with the ball head receiving means 236a of the conveying element 231a. If the conveying elements 231a and 231b are in the shown connected state during the conveying process, the conveying elements are pushed through the conveying channel 232 in that the respective rear conveying element 231b in the conveying direction (see arrow) presses against the downstream conveying element 231a. In this manner, bulk goods can be transported by the conveying elements 231a, 231b in the conveying channel 232.

FIG. 24 shows a perspective view of a conveying element 241 being configured as inspecting element and comprising a plurality of cameras 242K and a plurality of lighting devices 242L which illuminate the areas which can be covered by the cameras, e.g., in order to inspect conveying pipes. Alternatively or additionally, one or more sensors can be provided, e.g., for measuring the temperature and/or the humidity. In the shown embodiment, the conveying element 241, e.g., comprises a respective camera 242K and a lighting device 242L at its front end 241a in the conveying direction (see arrow) and at its rear end 241b in the conveying direction and additionally two further cameras 242K with respective lighting devices 242L which are arranged at the shank 244 of the conveying element 241 for inspecting, e.g., inner pipe sections perpendicularly with respect to the longitudinal axis of the shank 244. In the shown embodiment, the rear disk 243 can have, similar to the front disk 243', openings, in this case for being able to carry out an inspection along the longitudinal axis of the shank 244.

FIG. 25 shows a perspective view of a conveying element 251 being configured as cleaning element and comprising at least one cleaning device 252 which is arranged, e.g., at the front and/or rear end 254a, 254b of the shank 254 of the conveying element 251 and is protected from an undesired slipping off the shank 254 to the front in the conveying direction (see arrow) by the guide disk 253' and to the rear in the conveying direction by the scraper disk 253.

The present invention therefore provides a conveying element and a conveying device by means of which the conveying performance can be increased while at the same time energy can be saved. Moreover, by means of the present concept, conveying heights of about 60 m can be reached, so that the conveying device as a whole needs a relatively small base surface while the conveying performance remains unchanged because a more effective usage is possible in all dimensions of the room, and moreover the conveying device can be configured individually. Since the bulk goods are conveyed in the conveying pipe by means of separate individual bodies (conveying elements, carriers) which push or press the bulk goods through the conveying pipe, there is only a slight relative movement of the bulk goods, which reduces segregation and inner friction. Moreover, the structure, assembly and maintenance of the conveying device is simple (individual conveying elements can be replaced easily, the pipe can be inspected without any problems during operation of the conveying device by means of particular conveying elements) and it can moreover be cleaned easily because residues cannot collect in the conveying pipe, bulk goods cannot be carried off and cleaning can be carried out during ongoing operation of the conveying device by means of the particular conveying elements intended for this purpose. Moreover, a drive is only necessary in a specific section of the conveying pipe so that—with the drive and the bulk goods feeding device being spatially separated—the drive does not come in contact with the bulk goods (high sanitation).

The invention claimed is:

1. A conveying element for conveying bulk goods, comprising:
   a disk element comprising an upper side, a lower side and a side surface along a circumference of the disk element;
   a shank which comprises at its upper end or at its lower end a shank head and which is connected at its lower end to the upper side of the disk element; and
   a guide disk element which is arranged substantially parallel to the disk element in the direction of the shank head of the shank,
   wherein the conveying element comprises a shank head receiving means at the lower side of the disk element or at the shank,
   wherein the side surface of the disk element is inclined at least in sections relative to a longitudinal axis of the shank, and
   wherein the guide disk element comprises recesses which let bulk goods go through.

2. A conveying element for conveying bulk goods, comprising:
   a disk element comprising an upper side, a lower side and a side surface along a circumference of the disk element;
   a shank comprising an upper end and a lower end:
   a shank head located at the upper end;
   the lower end being connected to the upper side of the disk element and extending through the disk element up to the lower side;
   a shank head receiving element arranged on one of:
   the lower side of the disk element; or
   the lower end,
   wherein the side surface of the disk element is inclined at least in sections relative to a longitudinal axis of the shank.

3. The conveying element according to claim 2, wherein the inclined side surface comprises centering cams.

4. The conveying element according to claim 2, wherein the side surface and the upper side extend to a first disk edge and the side surface and lower side extend to a second disk edge and said first disk edge more rounded than the second disk edge.

5. The conveying element according to claim 2, wherein the shank head receiving element is sized and configured to receive the shank head of another conveying element.

6. The conveying element according to claim 2, wherein the conveying element comprises plural outer surfaces made of plastic.

7. The conveying element according to claim 2, wherein the conveying element comprises plural integrally formed outer surfaces.

8. The conveying element according to claim 2, wherein the shank comprises one of:
   a metal core; and
   a non-magnetic metal core.

9. The conveying element according to claim 2, wherein the conveying element further comprises a wear display element.

10. The conveying element according to claim 9, wherein the wear display element is arranged at least one of:
    on the side surface of the disk element; and/or
    in the disk element.

11. The conveying element according to claim 2, wherein the conveying element further comprises a guide disk element arranged substantially parallel to the disk element and located closer to the shank head than to the disk element.

12. The conveying element according to claim 11, wherein the guide disk element comprises recesses which allow bulk goods to pass through.

13. The conveying element according to claim 2, wherein the conveying element further comprises at least one cleaning device.

14. The conveying element according to claim 2, wherein the conveying element further comprises at least one of:
    at least one camera;
    at least one sensor; and/or;
    at least one lighting device.

15. The conveying element according to claim 2, wherein the conveying element further comprises a label that is configured to at least one of:
    automatically identify the conveying element; and/or
    automatically localize the conveying element.

16. A conveying device for conveying bulk goods comprising:
    at least one conveying element according to claim 15; and
    a reader for reading out the label.

17. A conveying element for conveying bulk goods, comprising:
    a shank comprising an upper end and a lower end:
    a rounded head located at the upper end;
    a disk element comprising an upper side, a lower side and an outer circumferential side surface;
    the disk element being arranged on the shank;
    a rounded recess spaced from the lower side of the disk element;
    the disk element being located closer to the lower end than to the upper end;
    wherein one of:
        the outer circumferential side surface is inclined relative to a longitudinal axis of the shank;
        the upper side comprises plural centering projections arranged adjacent the outer circumferential side surface; and
        the upper side comprises an annular centering projection arranged adjacent the outer circumferential side surface.

18. The conveying element according to claim 17, wherein the conveying element further comprises a guide disk element arranged substantially parallel to the disk element and located closer to the rounded head than to the disk element.

19. The conveying element according to claim 18, wherein the guide disk element comprises recesses which allow bulk goods to pass through.

\* \* \* \* \*